(12) United States Patent
Endo et al.

(10) Patent No.: US 7,167,823 B2
(45) Date of Patent: Jan. 23, 2007

(54) MULTIMEDIA INFORMATION RETRIEVAL METHOD, PROGRAM, RECORD MEDIUM AND SYSTEM

(75) Inventors: Susumu Endo, Kawasaki (JP); Yuusuke Uehara, Kawasaki (JP); Daiki Masumoto, Kawasaki (JP); Syuuichi Shiitani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 806 days.

(21) Appl. No.: 10/305,184

(22) Filed: Nov. 27, 2002

(65) Prior Publication Data

US 2003/0103675 A1   Jun. 5, 2003

(30) Foreign Application Priority Data

Nov. 30, 2001   (JP) ............................. 2001-365801

(51) Int. Cl.
*G06F 17/30*   (2006.01)
*G06F 7/00*   (2006.01)

(52) U.S. Cl. ........................................ 704/7; 704/104.1

(58) Field of Classification Search ...................... None
See application file for complete search history.

(56) References Cited

U.S. PATENT DOCUMENTS

| | | | |
|---|---|---|---|
| 5,598,557 A | 1/1997 | Doner et al. | |
| 6,243,713 B1 | 6/2001 | Nelson et al. | |
| 6,460,036 B1 * | 10/2002 | Herz ............................ | 707/10 |

FOREIGN PATENT DOCUMENTS

EP   1 262 883   12/2002

OTHER PUBLICATIONS

Hidalgo et al. "Categorizing photographs for user-adapted searching in a news agency e-commerce application" NDDI-2001, 7-10, Jul. 2001.*
Jaimes et al., "A Conceptual Framework for Indexing Visual Information at Multiple Levels," IS&T/SPIE Internet Imaging, vol. 3964, Jan. 2000.*
Jin et al., "Meta-scoring: Automatically Evaluating Term Weighting Schemes in IR without Precision-Recall" SIGIR 2001: Proceedings of the 24th Annual International ACM SIGIR Conference on Research and Development in Information Retrieval, Sep. 9-13, 2001, New Orleans, Louisiana.*
Sable et al. "Text-Bases Approaches for the Categorization of Images" in Proc. of the Third Annual conference on Research and Advanced Technology for Digital Libraries Paris 1999. ☐☐*

* cited by examiner

*Primary Examiner*—V. Paul Harper
(74) *Attorney, Agent, or Firm*—Staas & Halsey LLP

(57) ABSTRACT

Paired image information and text information correlated to each other are retrieved as information sets. Frequency information on words used in text is extracted from text information in a group of information sets, and text information features are extracted based on frequency information. Text features are used to lay out information sets in a virtual space such that similar pieces of text are located close to each other, and images are displayed at those positions. Further, important words are extracted from those words extracted from text information in a group of information sets, and those words are laid out in the virtual space in the same manner as with information sets and displayed as labels.

21 Claims, 22 Drawing Sheets

MULTIMEDIA INFORMATION RETRIEVAL METHOD, PROGRAM, RECORD MEDIUM AND SYSTEM

BACKGROUND OF THE INVENTION

1. Field of the Invention

The present invention relates generally to a multimedia information retrieval method, program, record medium and system for the efficient retrieval of multimedia information and, more particularly to a multimedia information retrieval method, program, record medium and system for the efficient retrieval of information sets comprised of pairs of image information and text information.

2. Description of the Related Arts

Recent years there have been increasing occasions for PC users to come into contact with multimedia information in proportion to PCs' performance improvements coupled with growth in amount of information handled by each user, as a result of which it has become necessary to find needed information from among such pieces of multimedia information. There is a conventional method for multimedia information retrieval, in which text information accompanying multimedia information is keyword-retrieved.

However, the traditional multimedia information retrieval method by keyword is unable to assure high search accuracy unless search criteria precisely representing target information can be given. In the case of multimedia information, in particular, it is difficult to specify search criteria which can precisely represent target information. Additionally, users themselves have often only ambiguous understanding of target information. For this reason, users can only specify broad search criteria, thus causing a great number of matches to be found. Even if users, faced with such numerous matches, attempt to narrow their search by giving a new keyword, they find it difficult to determine what type of keyword would be appropriate. Consequently, users need to narrow their search by repeatedly specifying a randomly-chosen keyword, which has made it difficult to assure high search accuracy and efficiency.

SUMMARY OF THE INVENTION

The present invention provides a multimedia information retrieval method, program and system which allow highly accurate and efficient retrieval of necessary information from among multimedia information.

According to a first aspect of the present invention there is provided a multimedia information retrieval method comprising:

a word frequency extraction step using as information sets paired image information and text information correlated to each other and extracting constituent word frequency information from the text information within the information sets;

a text feature extraction step extracting text features, based on the word frequency information of individual information sets;

an information set classification and layout step classifying and laying out the information sets in a virtual space, based on the text features;

a label feature extraction step selecting labels from constituent words of the text information within each information set and extracting features of selected labels;

a label layout step placing labels at positions corresponding to information sets classified and laid out in the virtual space, based on the label features; and an information display step displaying image information and labels of the information sets, placed in the virtual space, depending on the positions of the viewpoint.

For example, the information set classification and layout step includes classifying and laying out the information sets on a two-dimensional plane at a predetermined position in a three-dimensional virtual space, based on the text features, and the label layout step includes placing the labels at the front of the two-dimensional plane in which the information sets are classified and laid out, based on the label features. In this manner, the multimedia information retrieval method of the present invention retrieves as information sets paired image information and text information correlated with each other. Frequency information on words used in text is extracted from text information in the information sets, and text information features are extracted based on the frequency information. The text features are numerical representations of the text features, texts similar in contents have similar text features. The text features are used to lay out information sets in a virtual space such that similar pieces of text are located close to each other, and images are displayed at those positions. Thus, while visually grasping the contents by use of images whose contents can rapidly be grasped regardless of large quantities of layout, the user can move to the position where the information exists by walking through the three-dimensional space and examine the image information of the information set in proximity thereof and the text information corresponding thereto to consequently grasp the contents. Further, important words are extracted as labels from those words extracted from text information in the information set, and those labels are laid out in the virtual space in the same manner as with information sets and displayed as keywords. This label layout enables the user to grasp what information is contained in the information set and where it is localized. For this reason, visual retrieval becomes possible through the display of the images laid out based on the text similarity, whereby efficient retrieval can be carried out regardless of the presence of large quantities of retrieval results. The display of the labels enables the users to easily grasp what information is contained in the information sets and easily refer to the relevant information through the movement to the vicinity of the label.

The text feature extraction step comprises:

a morpheme analysis step extracting predetermined parts of speech such as nouns, noun compounds and adjectives by morpheme analyses of text information and creating a word list comprised of words used and their frequencies of occurrence;

a matrix creation step creating a word-text matrix whose rows and columns correspond respectively to text information and words and in which word frequencies of occurrence are laid out as elements; and a text feature conversion step expressing text information of the word-text matrix by document vectors having coordinate points determined by frequencies of occurrence in a word space which has words as axes, projecting the document vectors onto a low-dimensional space by singular value decomposition and using as text features document vectors representing positions in the low-dimensional space.

The matrix creation step of the text feature conversion step comprises a weight assignment step assigning weight to elements in the word-text matrix, based on word frequencies of occurrence in each text. This allows words appearing in specific texts only to be handled as being higher in degree featuring that text, i.e., higher in significance than words appearing in all texts without exception.

The label feature extraction step comprises a label selection step figuring out the significance of each constituent word of text information within each of the information sets and selecting words to be used as labels, based on the significance figured out.

The label selection step comprises:

a morpheme analyses step extracting nouns and noun compounds by morpheme analyses of text information and creating a word list comprised of words used and their frequencies of occurrence;

a matrix creation step creating a word-text matrix whose rows and columns correspond respectively to text information and words and in which the word frequencies of occurrence are laid out as elements; and a label feature conversion step expressing words of the word-text matrix by word vectors having coordinate points determined by frequencies of occurrence in a text space which has individual pieces of text information as axes, projecting the word vectors onto a low-dimensional space by singular value decomposition and using as label features word vectors representing positions in the low-dimensional space; wherein a predetermined number of words are selected as labels in descending order of significance which is represented by lengths of the word vectors. The word-text matrix in this label selection step is the same as one created in the text feature extraction step, and hence use of the same word-text matrix allows omission of the morpheme analysis step and the matrix creation step. The label layout step includes displaying labels such that the higher the significance figured out by the label selection step, the more the labels are displayed toward the front of the virtual space. The information display step includes changing how labels appear and the size in which they appear, depending on the position of the viewpoint relative to the virtual space. The information display step includes fixing the horizontal position of the label relative to image information regardless of a horizontal displacement of the viewpoint in the virtual space and changing how labels appear and the size in which they appear depending on a change in the position of the viewpoint in the direction of depth. Thus, in case of walking through the virtual space with the movement of the viewpoint, the position of the label relative to the image is unvaried regardless of a horizontal movement of the viewpoint, preventing labels closer to the forefront from moving horizontally to a larger extent, making the correlation with the image unclear, as in the case of execution of the ordinary three-dimensional coordinates calculation. The multimedia information retrieval method of the present invention further comprises an information collection step collecting from the Internet information sets comprised of paired image and text information correlated to each other. In this case, the information collection step comprises a relation analysis step analyzing the relationship between image information and text information and determining the range of information to be collected as information sets, if the relationship between the image information and the text information is unclear.

According to a second aspect of the present invention there is provided a program for retrieving multimedia information. This program allows a computer to execute:

a word frequency extraction step using as information sets paired image information and text information correlated to each other and extracting constituent word frequency information from the text information within the information sets;

a text feature extraction step extracting text features, based on the word frequency information of individual information sets;

an information set classification and layout step classifying and laying out the information sets in a virtual space, based on the text features;

a label feature extraction step selecting labels from constituent words of the text information within each information set and extracting features of selected labels;

a label layout step placing labels at positions corresponding to information sets classified and laid out in the virtual space, based on the label features; and an information display step displaying image information and labels of the information sets, placed in the virtual space, depending on the positions of the viewpoint.

According to a third aspect of the present invention there is provided a computer readable record medium having therein stored a program for retrieving multimedia information. The program stored in this record medium allows a computer to execute:

a word frequency extraction step using as information sets paired image information and text information correlated to each other and extracting constituent word frequency information from the text information within the information sets;

a text feature extraction step extracting text features, based on the word frequency information of individual information sets;

an information set classification and layout step classifying and laying out the information sets in a virtual space, based on the text features;

a label feature extraction step selecting labels from constituent words of the text information within each information set and extracting features of selected labels;

a label layout step placing labels at positions corresponding to information sets classified and laid out in the virtual space, based on the label features; and an information display step displaying image information and labels of the information sets, placed in the virtual space, depending on the positions of the viewpoint.

According to a fourth aspect of the present invention there is provided a multimedia information retrieval system. This system comprises:

a word frequency extraction unit using as information sets paired image information and text information correlated to each other and extracting constituent word frequency information from the text information within the information sets;

a text feature extraction unit extracting text features, based on the word frequency information of individual information sets;

an information set classification and layout unit classifying and laying out the information sets in a virtual space, based on the text features;

a label feature extraction unit selecting labels from constituent words of the text information within each information set and extracting features of selected labels;

a label layout unit placing labels at positions corresponding to information sets classified and laid out in the virtual space, based on the label features; and an information display unit displaying image information and labels of the information sets, placed in the virtual space, depending on the positions of the viewpoint.

Details of the program, record medium and system are substantially the same as the case of the multimedia information retrieval method.

The above and other objects, aspects, features and advantages of the present invention will become more apparent from the following detailed description when taken in conjunction with the accompanying drawings.

DETAILED DESCRIPTION OF THE PREFERRED EMBODIMENT

Figure 1:
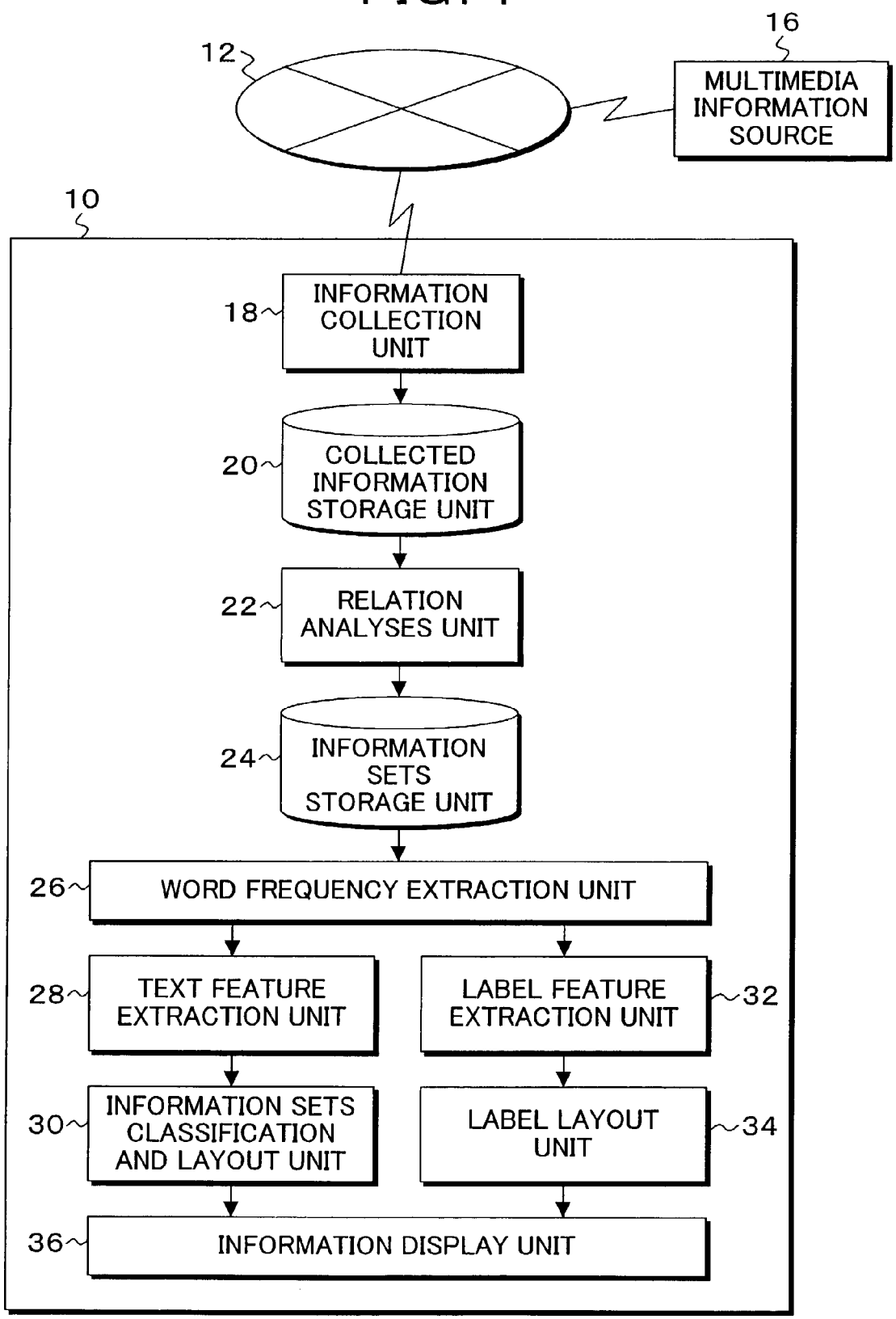
FIG. 1 is a block diagram representing the functional configuration of the present invention.

FIG. 1 is a block diagram depicting the system configuration of a multimedia information retrieval system of this invention, and the multimedia information retrieval system 10 according to the present invention accesses a multimedia information source 16, comprised of a plurality of WEB pages, via the Internet 12 and treats information sets comprised of pairs of image text information within collected multimedia information as target information. That is, the multimedia information retrieval system 10 collects information sets comprised of pairs of image and text information from the multimedia information source 16 via the Internet 12, extracts text feature from text information contained in collected information sets and lays out information sets in a virtual space based on similarities between different pieces of text information before displaying image information. Further, the system displays labels each of which will serve as landmark for retrieving image information to indicate the contents and locations of individual pieces of image information. In order to ensure that such images and labels of multimedia information can be displayed and retrieved three-dimensionally, the multimedia information retrieval system 10 according to the present invention comprises an information collection unit 18, a collected information storage unit 20, a relation analyses unit 22, an information sets storage unit 24, a word frequency extraction unit 26, a text feature extraction unit 28, an information set classification and layout unit 30, a label feature extraction unit 32, a label layout unit 34 and an information display unit 36. Of these units, the word frequency extraction unit 26 handling information set classification and layout, the text feature extraction unit 28 and the label feature extraction unit 32 are depicted in detail in a block diagram shown in FIG. 2.

Figure 2:
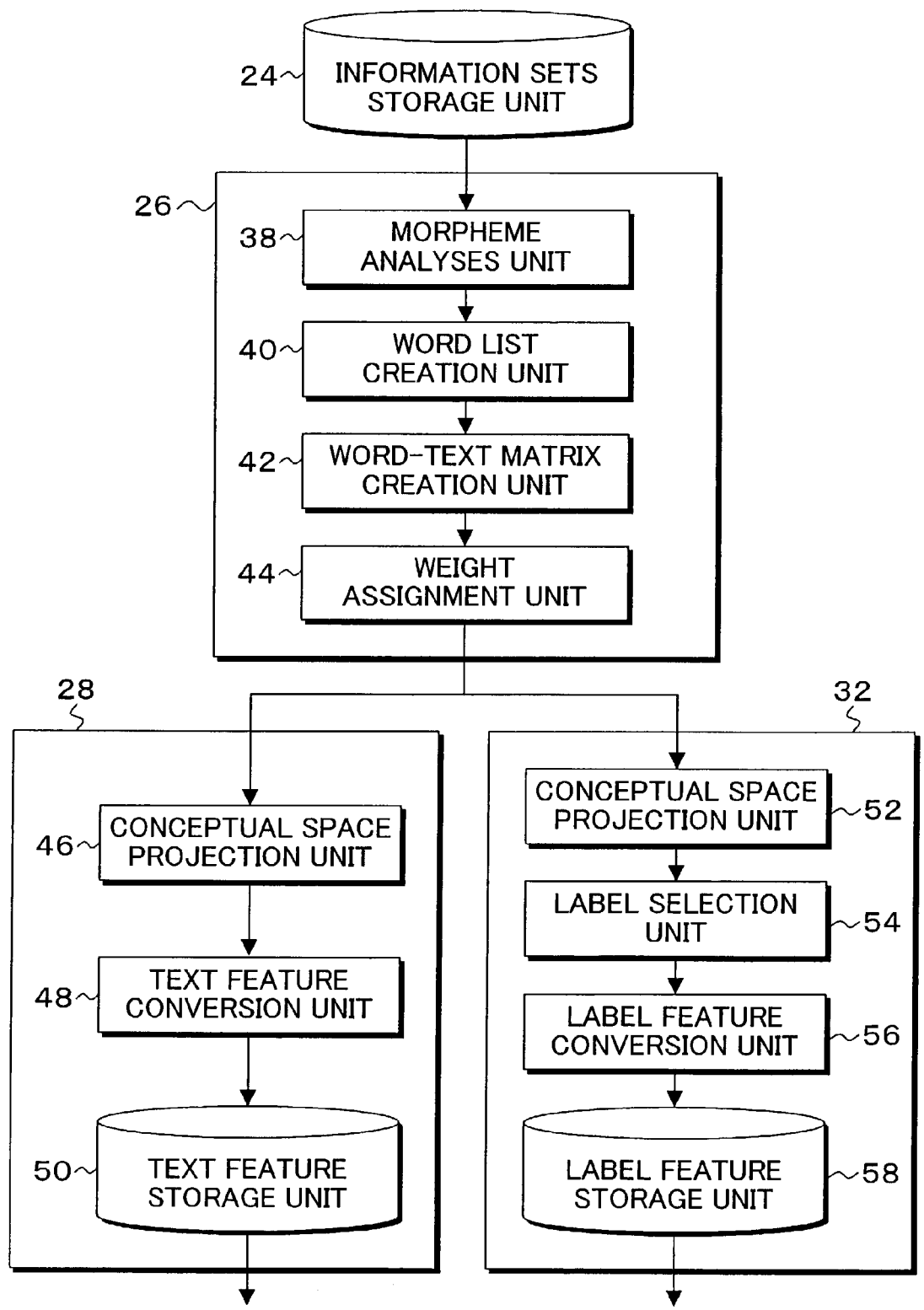
FIG. 2 is a block diagram representing the detailed configurations of a word frequency extraction unit, a text feature extraction unit and a label feature extraction unit.

The word frequency extraction unit 26 shown in FIG. 2 comprises a morpheme analyses unit 38, a word list creation unit 40, a word-text matrix creation unit 42 and a weight assignment unit 44. The text feature extraction unit 28, on the other hand, comprises a low-dimensional space projection unit 46, a text feature conversion unit 48 and a text feature storage unit 50. Moreover, the label feature extraction unit 32 comprises a low-dimensional space projection unit 52, a label selection unit 54, a label feature conversion unit 56 and a label feature storage unit 58.

Figure 3:
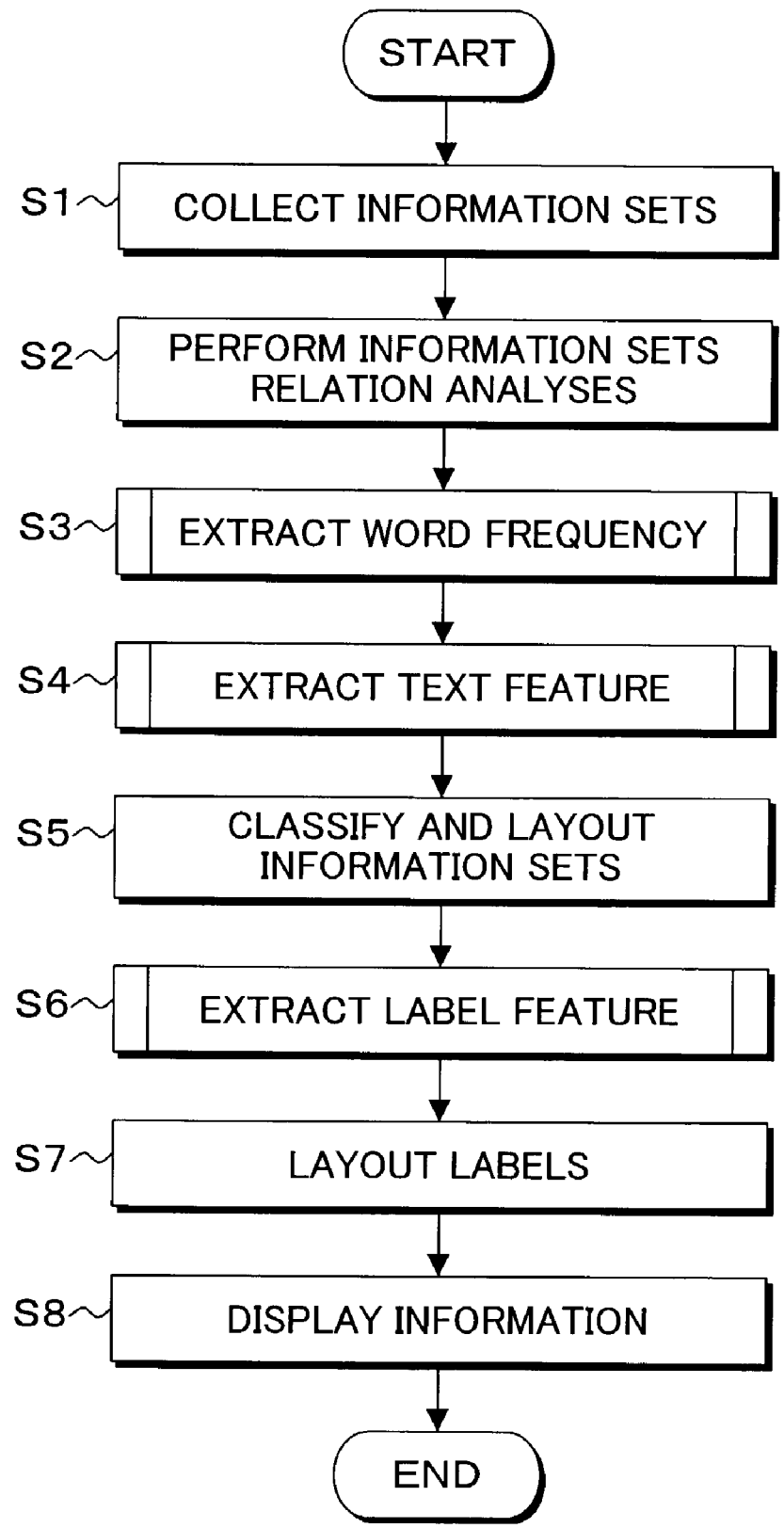
FIG. 3 is a-flowchart depicting multimedia information retrieval according to this invention.

FIG. 3 is a flowchart of the program run on the multimedia information retrieval system 10 shown in FIG. 1, and Steps 1 through 8 correspond to the functions of the respective processing units of the system. In Step S1, information sets are collected by the information collection unit 18. In Step S2, information sets relation analyses are performed by the relation analyses unit 22. In Step S3, word frequency is extracted by the word frequency extraction unit 26. In Step S4, text feature is extracted by the text feature extraction unit 28. In Step S5, information sets are classified and laid out by the information set classification and layout unit. These steps or Steps S1 through S5 are designed to classify and lay out information sets comprised of pairs of image and text information collected over the Internet, based on similarities between information sets. In the following step or Step 6, label feature extraction and label selection are performed by the label feature extraction unit 32, based on the frequency (significance) of words extracted by the word frequency extraction unit 26. In Step S7, labels are laid out by the label layout unit 34. The processing performed in these steps or Steps S6 and S7 is designed to classify and lay out labels for use as keywords for information sets laid out in a virtual space. In the final Step S8, image information within information sets, classified and laid out in a three dimensional display space, and its corresponding label are displayed by the information display unit 36.

Next, the processing performed by the multimedia information retrieval system 10 according to the present invention, shown in FIGS. 1 and 2, is described in detail in accordance with the flowchart shown in FIG. 3. To collect information sets in Step S3 shown in FIG. 3, the Klora known as an Internet information collection robot is employed. The Klora, which functions as the information collection unit 18 in FIG. 1, makes the rounds over the Internet 12 in accordance with specified criteria and tracks links, thereby tracking a plurality of WEB pages as the multimedia information source 16. This allows the Klora to collect images and their related text on WEB pages and stores image-text pairs as information sets. There are two methods to specify criteria with the Klora. One of them is to use URLs, by which pages under and linked to the specified URL are searched. Another method is to pass the keyword to the text search server (text search engine) first and then use a URL list returned in response to the keyword for searching WEB pages. Thus, information including image-text pairs, collected by the information collection unit 18 which performs collection of information sets in Step S1, is stored in the collected information storage unit 20. In the following Step S2, the relation analyses unit 22 performs information sets relation analyses, generates information sets comprised of image-text pairs and stores them in the information sets storage unit 24. Information sets relation analyses by the relation analyses unit 22 are made by choosing image-text pairs whose relationship is unclear from among those collected from the Internet, analyzing their relationship with the user, determining the range of information sets and storing those sets which fall within the range as information sets used by search of this invention. These relation analyses are performed by analyzing Klora-collected HTML files, estimating text-image relationship based, for example, on the number of line feeds inserted between image and text and also on the HTML tags and excerpting a predetermined range of text in order to determine information sets. In the succeeding Step S3, word frequency extraction is performed by the word frequency extraction unit 26.

Figure 4:
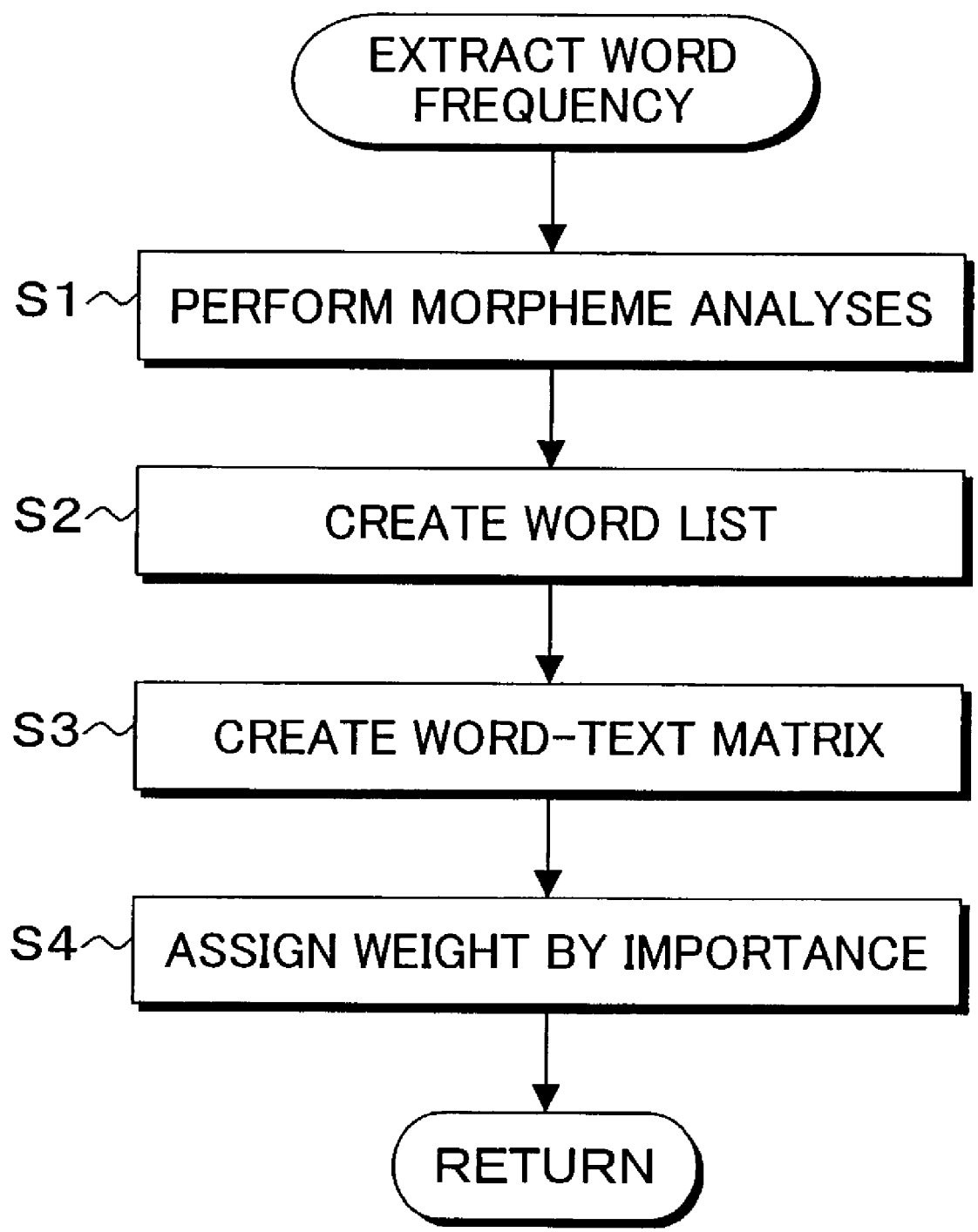
FIG. 4 is a flowchart of word frequency extraction shown in FIG. 3.
Figure 5:
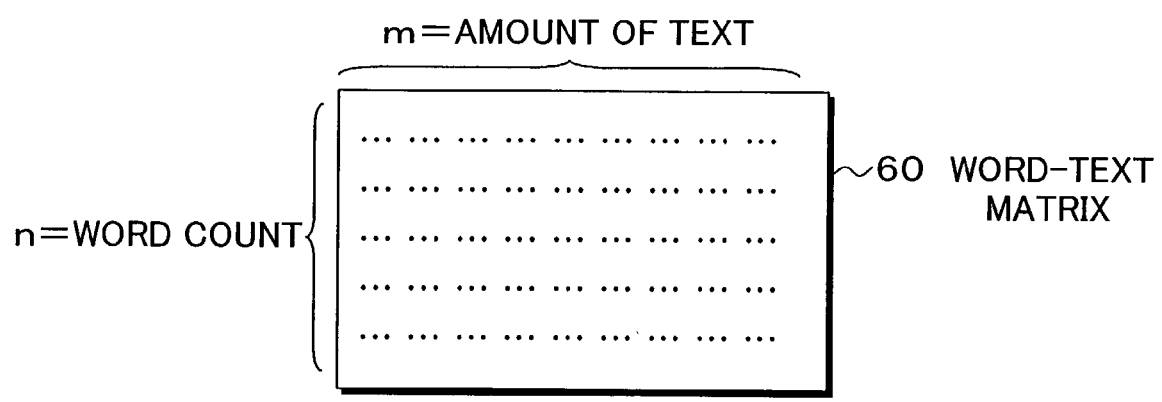
FIG. 5 is an explanatory drawing of a word-text matrix created by word frequency extraction shown in FIG. 3.
Figure 6:
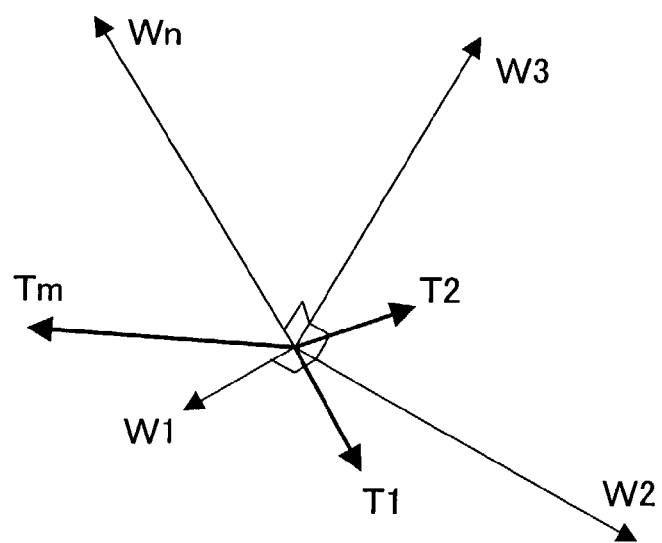
FIG. 6 is an explanatory drawing representing a word-text matrix by document vectors in the n-dimensional word space.

This word frequency extraction comprises morpheme analyses in Step S1, word list creation in Step S2, word-text matrix creation in Step S3 and weight assignment by significance in Step S4 as shown in FIG. 4 as the subroutine's flowchart of Step S5. This processing corresponds to the functional configuration of the word frequency extraction unit 26 shown in FIG. 2. Word frequency extraction in FIG. 4 starts with morpheme analyses in Step S1. In morpheme analyses, important words and their frequencies are extracted from text. More specifically, the morpheme analyses method is used to analyze part-of-speech information in text and separate it into morphemes. Further, of the separated morphemes those for parts of speech such as articles, conjunctions and pronouns which are unnecessary or do not occur frequently are deleted. In the embodiment of the invention, only nouns are extracted by these morpheme analyses. Moreover, specific morphemes are deleted or substituted based on rules. Further, whether a plurality of nouns can be combined, based on frequencies and rules, to form a compound noun representing a single meaning is evaluated, and if possible, a compound noun is generated by combining a plurality of nouns. Such morphemes, namely, nouns or compound nouns obtained by morpheme analyses are hereafter referred to as words. By performing such morpheme analyses over the entire text, a word list is created in which all the words, used in the entire text in Step S2, are arranged. In the following Step S3, a word-text matrix 60, in which rows and columns correspond respectively to individual pieces of text and words, is created as shown in FIG. 5 based on the entire text's word list. Each of the elements in this word-text matrix 60 represents the frequency of each word in the text. Consequently, each element in the word-text matrix 60 can be expressed in vector form as shown in FIG. 6. The coordinate space in FIG. 6 represents document vectors T1, T2, . . . , Tm, whose lengths are equal to word frequencies and which correspond to text 1, text 2, . . . , text m arranged along rows, in a word coordinate space having coordinate axes W1, W2 . . . , Wn which correspond to word 1, word 2, . . . , word n arranged along columns in the word-text matrix 60 shown in FIG. 5. In the succeeding Step S4 shown in FIG. 4, weight is assigned by significance to frequencies, each of which is an element in the word-text matrix in FIG. 5. In considering the significance of each word in each piece of text, it is generally possible to regard words which occur in only part of the text as being more important than those appearing uniformly in the entire text since the former are more useful for identifying that text. For this reason, in assigning weight in Step S4, TFIDF (Inverse Document Frequency of Term Frequency) is used to assign weight to the frequency of each word which is an element of the word-text matrix 60. This weight assignment by TFIDF is performed such that the lower the probability of occurrence of a word in other text, the higher the significance of that word. More specifically, weight W (ti) assigned to the frequency of each word is given by the following formula:

IDF($ti$)=log{(total text amount $m$)/(amount of text in which character $ti$ occurs)}

Weight $W(ti)$=IDF($ti$){ΣTF($ti$, $dj$)/(total text amount $m$)}

Figure 7:
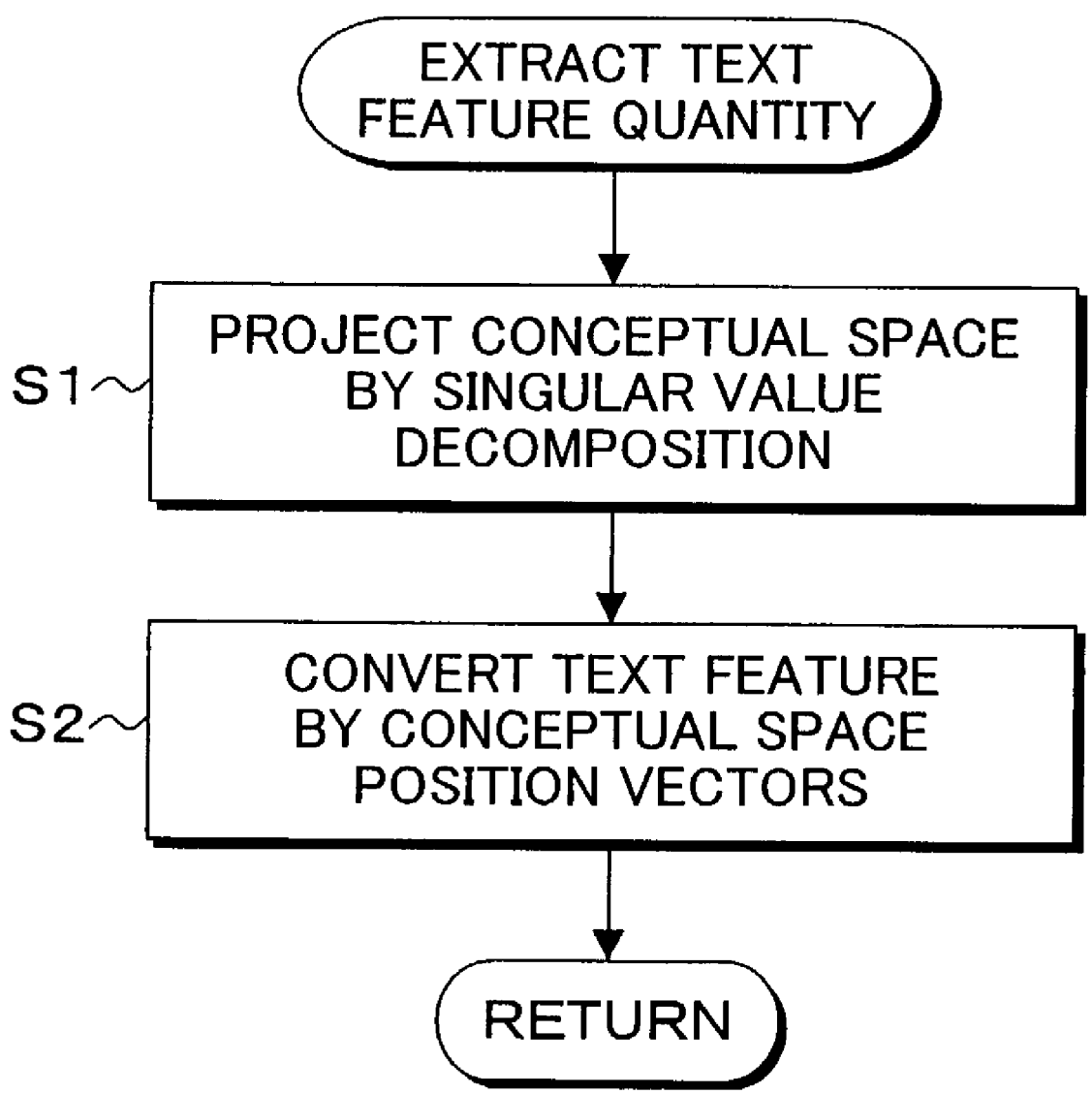
FIG. 7 is a flowchart of classification and layout of information sets shown in FIG. 3.

Referring again to FIG. 3, when word frequency extraction in Step S3 is complete, text feature extraction is performed in Step S4. In this text feature extraction, projection onto a low-dimensional space by singular value decomposition and text feature conversion by position vectors in the low-dimensional space are performed respectively in Steps S1 and S2, as shown by the subroutine's flowchart in FIG. 7. The processing conducted in Steps S1 and S2 corresponds to that performed by the low-dimensional space projection unit 46 and the text feature conversion unit 48 included in the feature extraction unit 28 shown in FIG. 2. For low-dimensional space projection in Step 1 shown in FIG. 7, since the word-text matrix 60, obtained by word frequency extraction, can be regarded as frequency vectors of individual words in each piece of text as shown in FIG. 5, each piece of text can be expressed by document vectors T1, T2, . . . , Tn having points in a word space which is a coordinate space having words W1, W2, . . . , Wn as axes, as shown in FIG. 7. Therefore, the LSI (Latent Semantic Indexing) method is used to map frequency vectors of the word-text matrix 60 onto a space of lower dimension. The LSI method is designed to degenerate highly co-occurrent words into a single axis by singular value decomposition.

Figure 8:
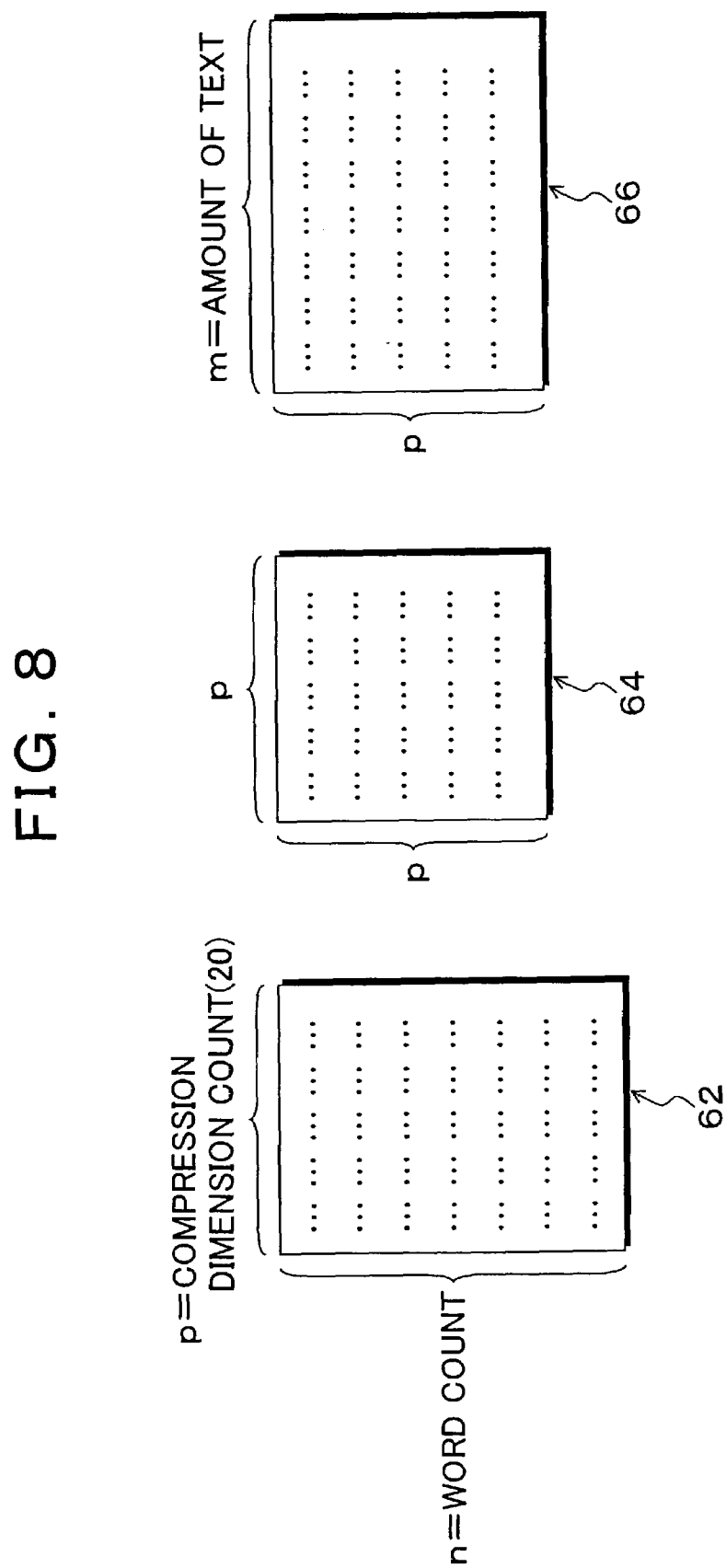
FIG. 8 is an explanatory drawing showing singular value decomposition of a word-text matrix.

FIG. 8 is a result of singular value decomposition of the word-text matrix 60 shown in FIG. 5. "p" is used as compression dimension count. Let us suppose, for example, that p=20. This singular-value-decomposed matrix illustrates a matrix 62 having word count=n along columns and compression dimension count p for amount of text along rows, a matrix 64 having compression dimension count p along both rows and columns and a matrix 66 having compression dimension count p for word count along columns and amount of text=m along rows. Of these matrices, the matrix 66 represents document vectors as a result of projection of vectors of text onto a low-dimensional space.

Figure 9:
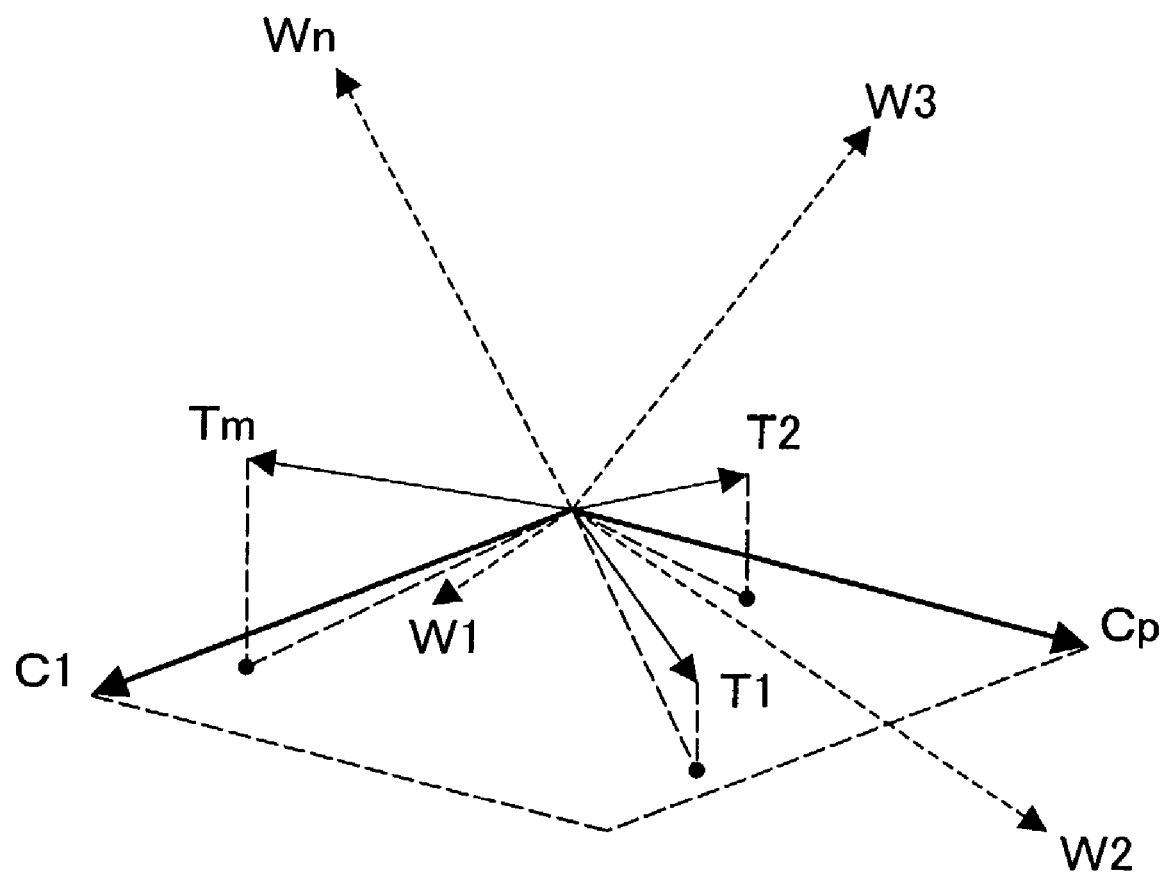
FIG. 9 is an explanatory drawing of a low-dimensional space converted from FIG. 6 by singular value decomposition.

FIG. 9 represents a projection of coordinate axes C1 and Cp (provided that p=2), a space which is lower in dimension than document vectors W1 to Wn in the nth order word space in FIG. 6, onto a low-dimensional space. In this low-dimensional space, since highly co-occurrent words are degenerated into a single axis, the individual dimensions C1 and Cp of the low-dimensional space correspond to a plurality of words having similar meanings, that is, combinations of a plurality of words likely to appear in a similar manner in the same piece of text. For example, if high co-occurrence is observed in two words, it is possible to determine that a piece of text containing only one of the words and another containing the other word are similar in the low-dimensional space, despite the fact that these pieces of text do not contain common words In the following Step S2 in FIG. 7, position vectors, representing the positions in the low-dimensional space as shown in FIG. 9, are extracted as text features of individual information sets.

Referring again to FIG. 3, when feature extraction is complete in Step S4, information sets are classified and laid out in the following Step S5. This classification and layout of information sets is conducted by laying out information sets, in accordance with text-related position vectors extracted in the low-dimensional space, in a plane using the SOM (Self-Organizing Maps) as shown in FIG. 9.

Figure 10:
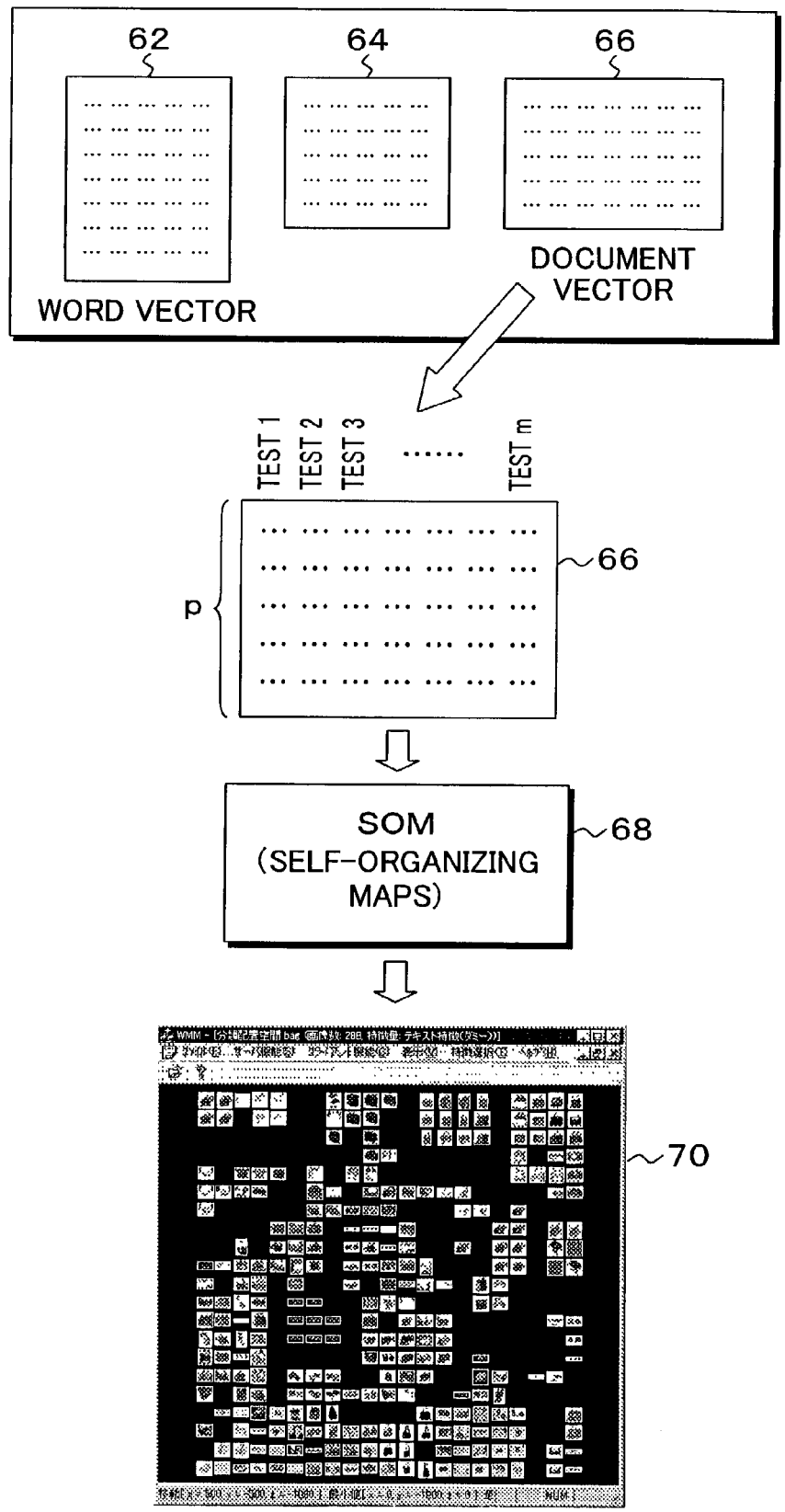
FIG. 10 is an explanatory drawing of classification and layout of information sets shown in FIG. 3.
Figure 11:
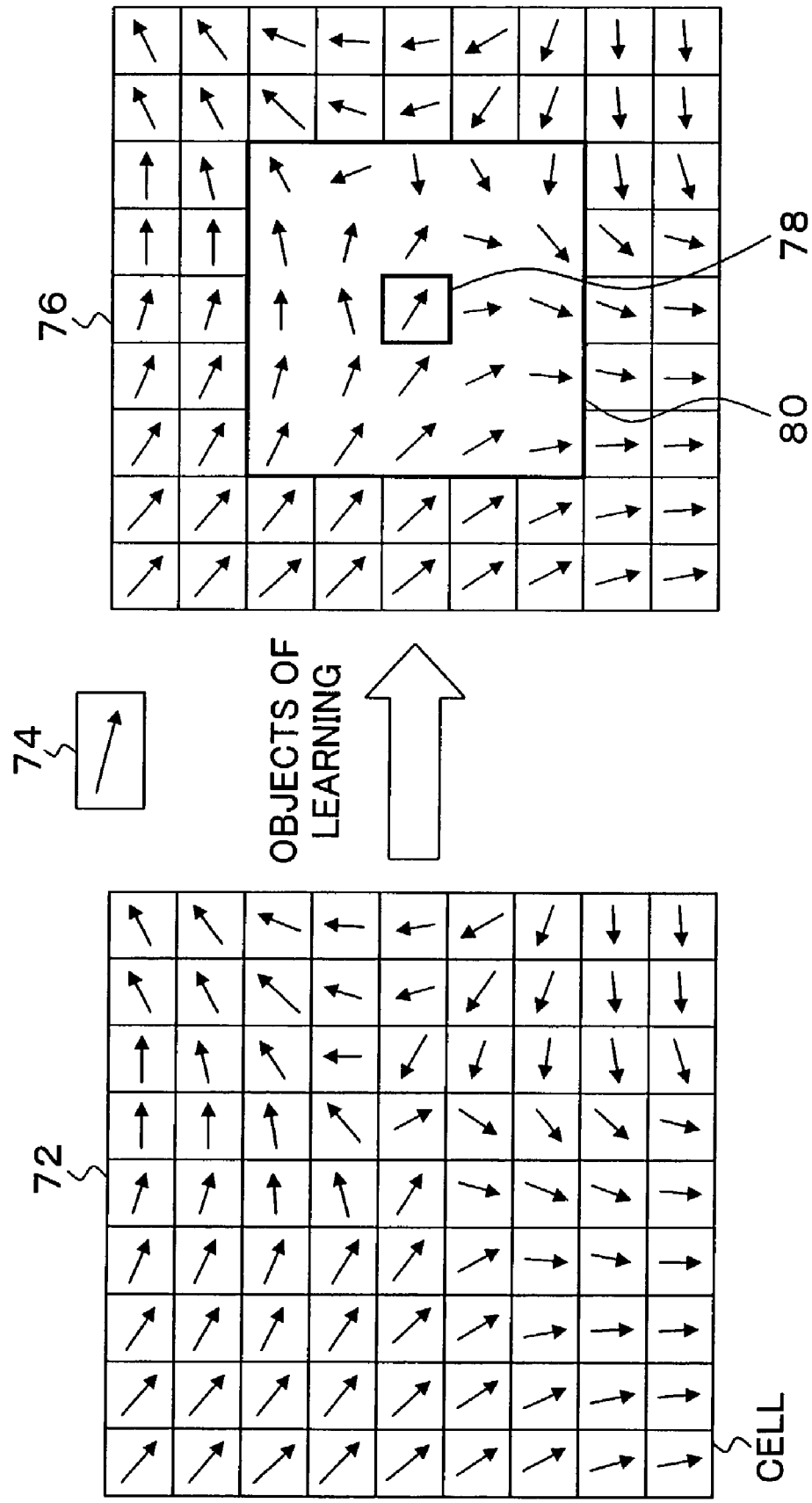
FIG. 11 is an explanatory drawing of layout by self-organizing maps (SOM)

FIG. 10 shows the procedure for classification and layout of information sets. That is, the matrix 66, obtained by text feature extraction and which will serve as a low-dimensional space, is extracted, and information sets are laid out using the SOM 68 in accordance with the position vectors, and a display screen 70, on which individual images are displayed at positions where information sets have been laid out, is created. The processing by the SOM is divided into learning and layout. The SOM's learning relies on arrangement of cells in a regular manner in a plane first and then updating of each cell-assigned vector value based on the input vector value 74 assigned as a focus of learning as shown in the pre-learning map 72 in FIG. 11, thereby obtaining a post-learning map 76. As a result of this learning, cells near an optimal cell 78, which has become the focus of learning 74, are laid out such that they possess similar vector values. As for the map 76, learning is performed by determining a range of learning 80 as appropriate. When such a learning process is complete, the cell with a vector value closest to the target vector value is placed, based on the map 76 obtained as a result of learning, at a position in the post-learning map. Consequently, highly similar pieces of text are placed at the same location, thus ensuring classification and layout in agreement with text feature.

Figure 12:
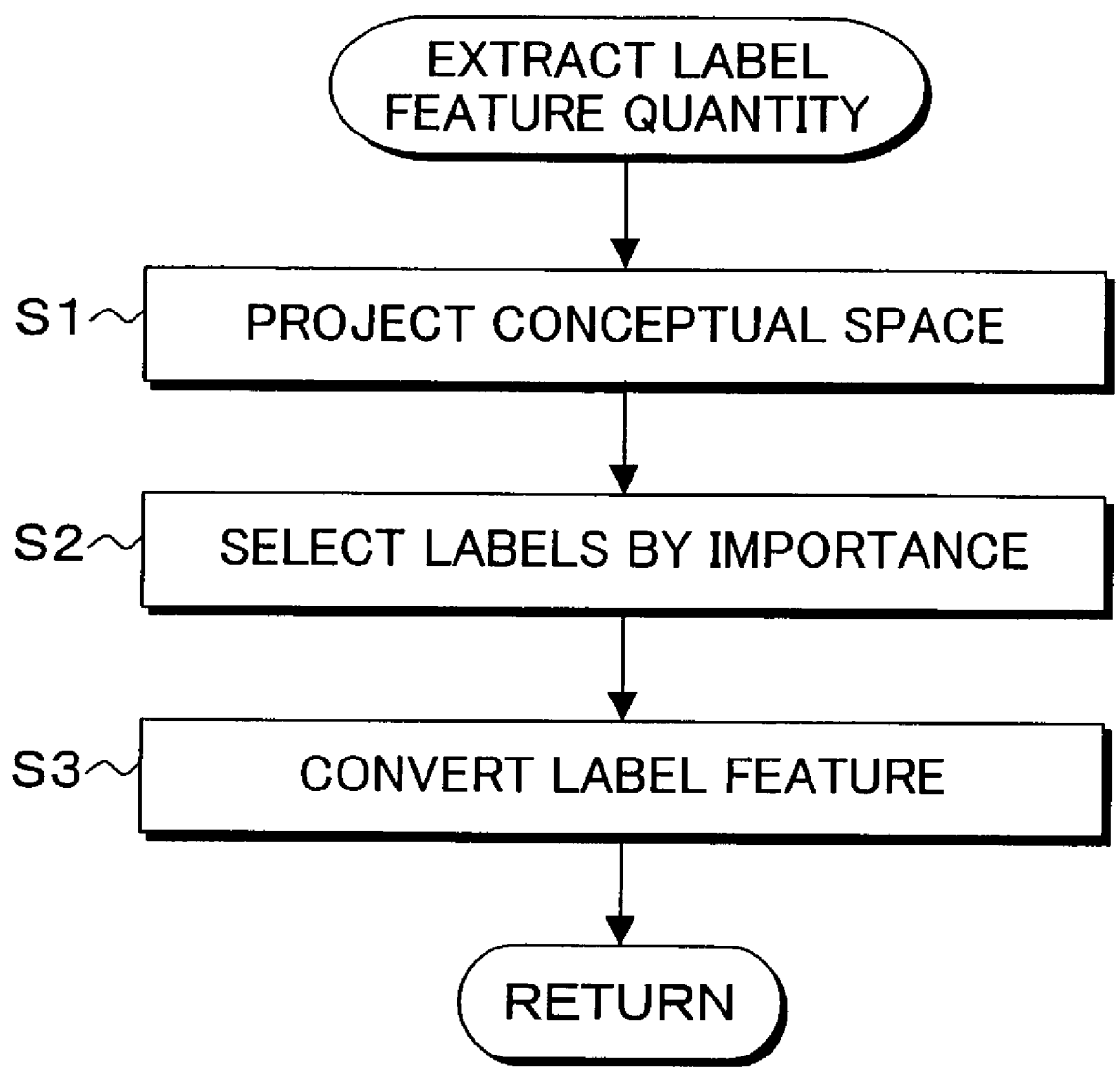
FIG. 12 is a flowchart of label feature extraction shown in FIG. 3.
Figure 13:
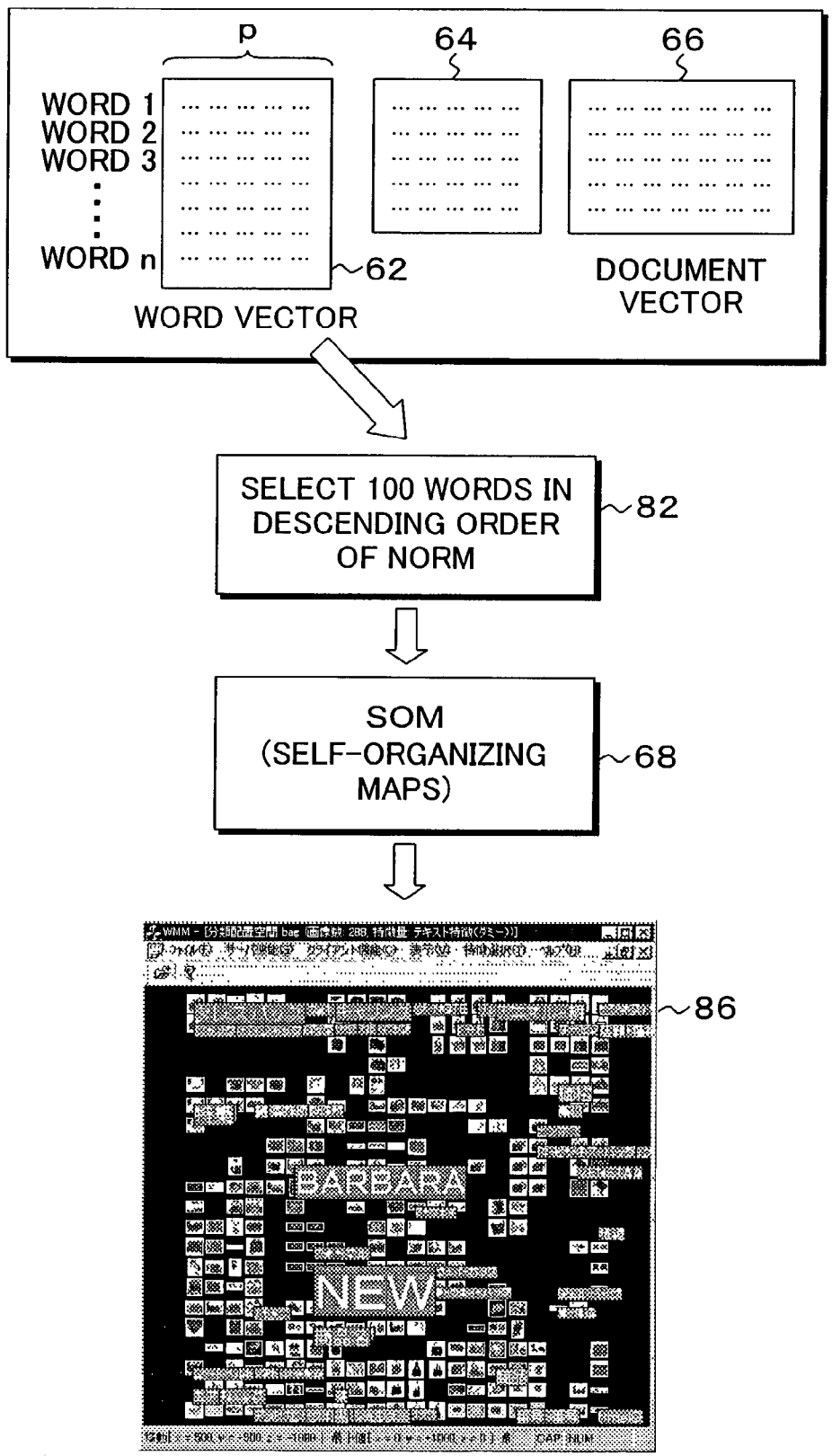
FIG. 13 is an explanatory drawing of label layout of this' invention.

Referring again to FIG. 3, when text-based classification and layout of information sets for the purpose of image layout are complete by following Steps S1 through S5, label feature extraction and label layout are performed in Steps S6 and S7. With label feature extraction in Step S6, projection onto a low-dimensional space in Step S1, label selection by significance in Step S1 and label feature conversion in Step S3 are performed as shown in the subroutine of FIG. 12. This label feature extraction for classification and layout of labels can be basically conducted in the same manner as with text. First, each of the words in the word-text matrix 60, obtained by word extraction and shown in FIG. 5, can be regarded as text containing only that word. Therefore, they are projected onto a low-dimensional space by singular value decomposition using the LSI method in the same manner as with text. This projection onto a low-dimensional space has already been given in the text-related processing as shown in FIG. 8. Therefore, the matrix 62, having word count n and expressed by word vectors whose lengths are equal to the frequency, is extracted as the result of projection onto a low-dimensional space by using text axes C1 to Cp of the matrix 62 as coordinate axes, as shown in FIG. 13. As for the matrix 62 having word vectors in the low-dimensional space, there are too many words to use them as labels. Therefore, label selection is performed such that only highly important words are chosen. For example, a label selection 82 is performed in which 100 words are chosen in descending order of norm. In this case, the lengths of word vectors in the low-dimensional space are nearly equivalent to the word frequencies. Since highly important words tend to have longer word vectors in the low-dimensional space, vector lengths in the low-dimensional space are employed as significance for label selection. In the following Step S3 in FIG. 12, the position vectors of selected words, obtained by projection onto the low-dimensional space, are extracted as label features.

Referring again to FIG. 3, when label feature extraction in Step S6 is complete, labels are laid out in Step S7 based on label features. This label layout uses the SOM as with text. However, since labels are placed at positions which are correlated with text classification and layout, the post-learning SOM 68, employed for text classification and layout, is used as is, and labels are simply laid out with no additional leaning as shown in FIG. 13, as a result of which a display screen 86 is obtained. Further, in conducting label layout, highly important labels, namely, labels with longer vectors are placed toward the front in the virtual space, and labels are placed such that the more the labels are located toward the front, the larger they appear on the screen. Naturally, labels are placed at the front of a predetermined two-dimensional plane in the virtual space in which text classification and layout have been performed. Consequently, those labels, placed in the direction of depth as seen from the viewpoint in the virtual space, are displayed. Moreover, the more the labels are placed toward the front, the larger they appear while the more they are placed toward the back, the smaller they appear. As a result, labels existing in the direction of depth and displayed in smaller size are hidden by front labels which are displayed in larger size. Therefore, it is possible to infer the contents of image information text by simply looking at the foremost label. Note that as the viewpoint is moved in the direction of depth and past a certain label, that label disappears and another label in the back of the vanished one appears. Note also that it is possible to determine whether to display labels in accordance with their distance from the viewpoint. By not displaying labels too close to or far from the viewpoint, it is possible to prevent an excessively close label from appearing large or a number of small labels from being displayed together, thereby ensuring easy viewing. When one walks through a virtual space in which images and text have been laid out by moving the viewpoint, search efficiency cannot be improved unless label positions and displayed image positions are always correlated. With three-dimensional coordinate calculations, normally, the more a label is placed toward the front, the more it moves horizontally if the viewpoint is moved horizontally. Therefore, images and labels may appear displaced from each other due to the horizontal movement of the viewpoint, thus resulting in loss of their relationship. In the present invention, therefore, labels remain fixed regardless of the horizontal movement of the viewpoint, and label sizes change only with the movement of the viewpoint in the direction of depth. Thus, by not horizontally moving labels, it is possible to move the viewpoint for walk-through while maintaining labels and images displayed in proximity to each other. When text-based classification and layout of information sets and classification and layout of labels which will be used as keywords are complete, image information and labels are displayed by information display in Step S8 of FIG. 3, as the viewpoint is moved in the virtual space with a mouse, the cursor, etc.

Figure 14:
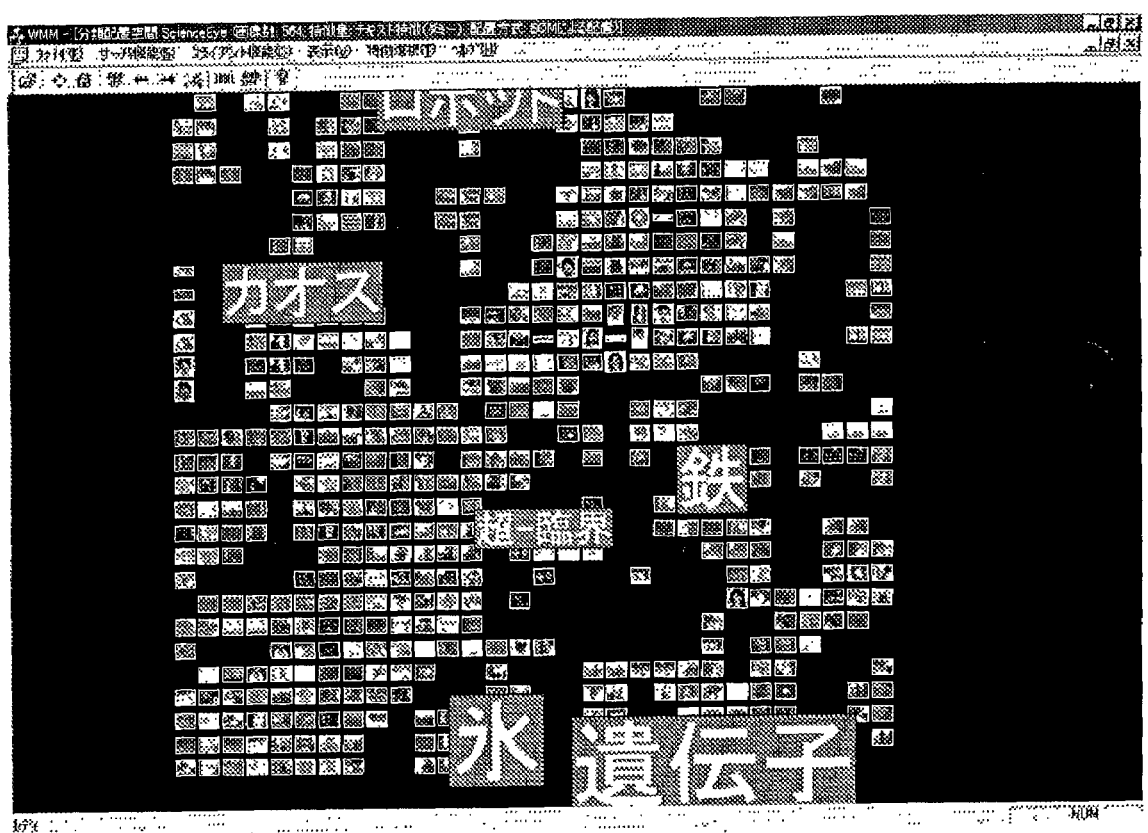
FIG. 14 is an explanatory drawing of a search screen according to this invention.
Figure 15:
FIG. 15 is an explanatory drawing of the search screen seen when the viewpoint is moved toward label "鉄" in the direction of depth.
Figure 16:
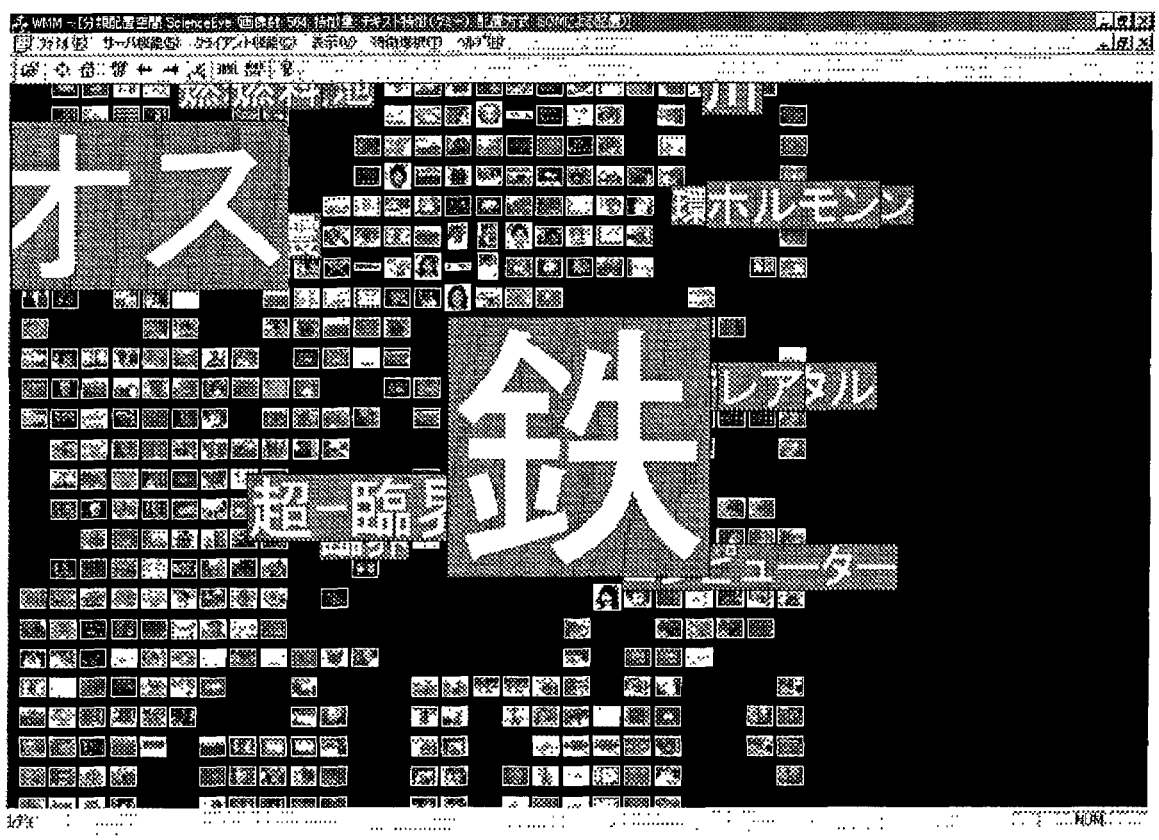
FIG. 16 is an explanatory drawing of the search screen seen when the viewpoint is moved further toward label "鉄" in the direction of depth.
Figure 17:
FIG. 17 is an explanatory drawing of the search screen seen when the viewpoint moves past label "鉄"
Figure 18:
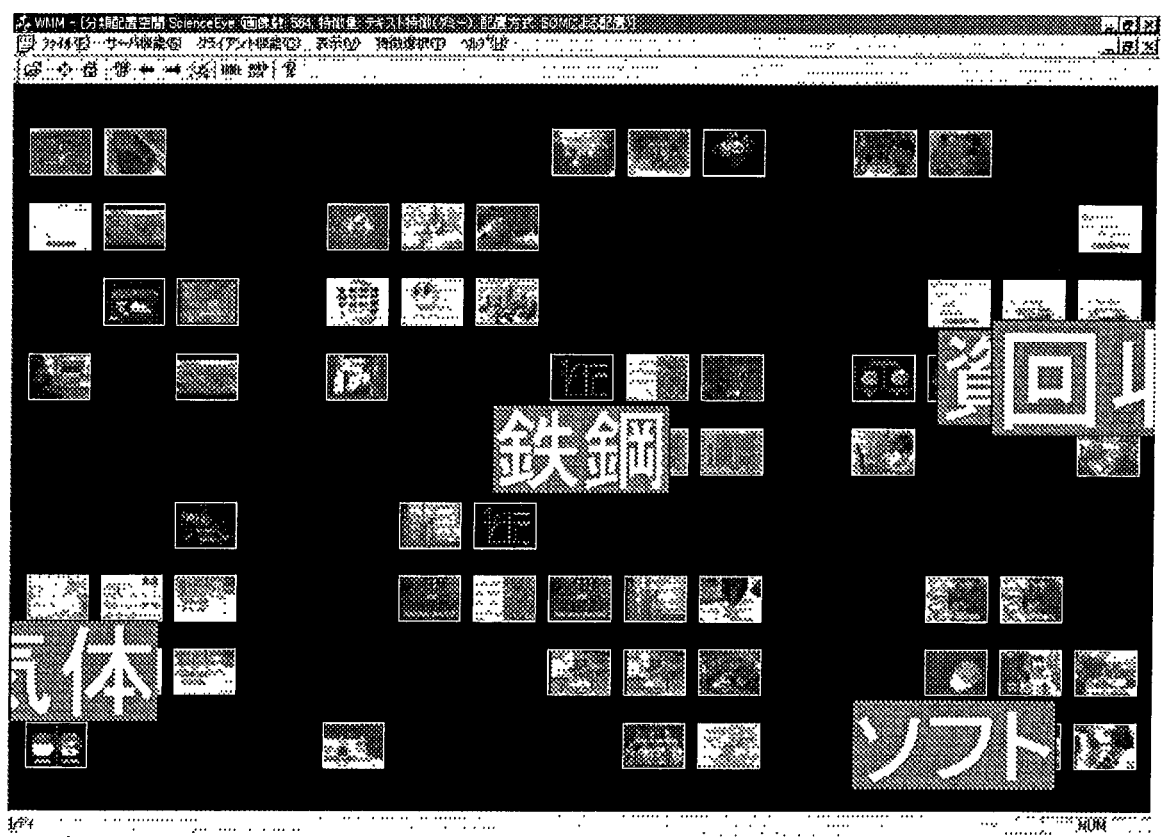
FIG. 18 is an explanatory drawing of the search screen seen when the viewpoint is moved further toward label "鉄鋼" in the direction of depth.
Figure 19:
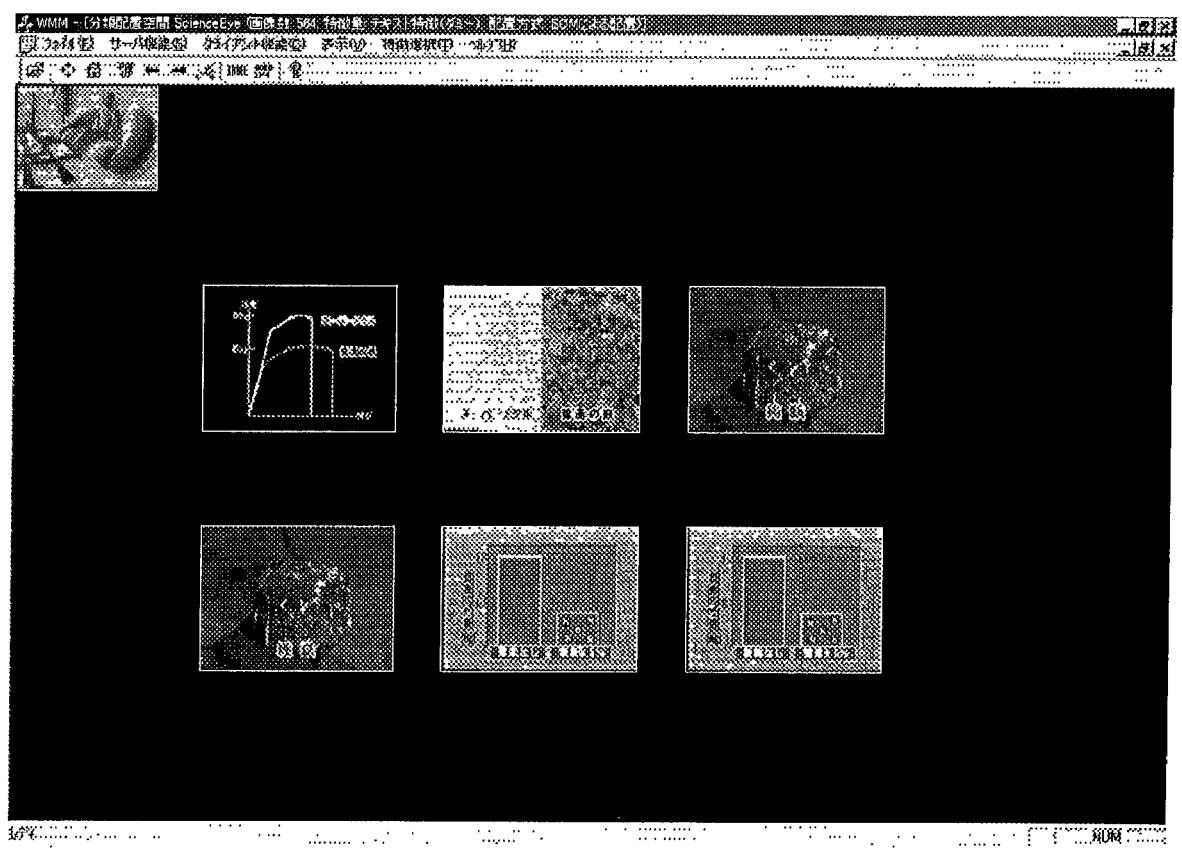
FIG. 19 is an explanatory drawing of the search screen seen when the viewpoint moves past label "鉄鋼"

FIGS. 14 through 19 show changes in the screen as a user moves the viewpoint in the direction of depth. FIG. 14 shows the initial search screen in which images, classified and laid out based on text features, are displayed in a two-dimensional plane which has been placed at a predetermined position along the depth in the virtual space. At the front of these images displayed by two-dimensional layout, labels, laid out based on label feature extraction according to this invention, appear. In this case, words for labels are placed such that the larger they are in size, the more they are placed toward the front. In the search screen shown in FIG. 14, suppose, for example, that the user moves the viewpoint in the direction of depth with label "鉄" as the target. Then, label "鉄" is enlarged as shown in FIG. 15. Further, as the viewpoint is moved in the direction of depth toward label "鉄", label "鉄" is gradually enlarged as shown in FIG. 16. Then, when the viewpoint moves past label "鉄", this label disappears and the label placed in the back appears as shown in FIG. 17. In this process, when the viewpoint is directed at label "鉄鋼" and moved further in the direction of depth, label "鉄鋼" appears enlarged as the viewpoint approaches this label as shown in FIG. 18. Moreover, when the viewpoint moves past label "鉄鋼", the image is reached which is placed in the back in the two-dimensional plane and which corresponds to label "鉄鋼" as shown in FIG. 19. Note that "鉄" and "鉄鋼" mean "iron" and "steel", respectively. When the user clicks on a specific image among those retrieved, it is possible to display text information which will serve as information set corresponding to that image or access the WEB page for the retrieved information set.

Figure 20:
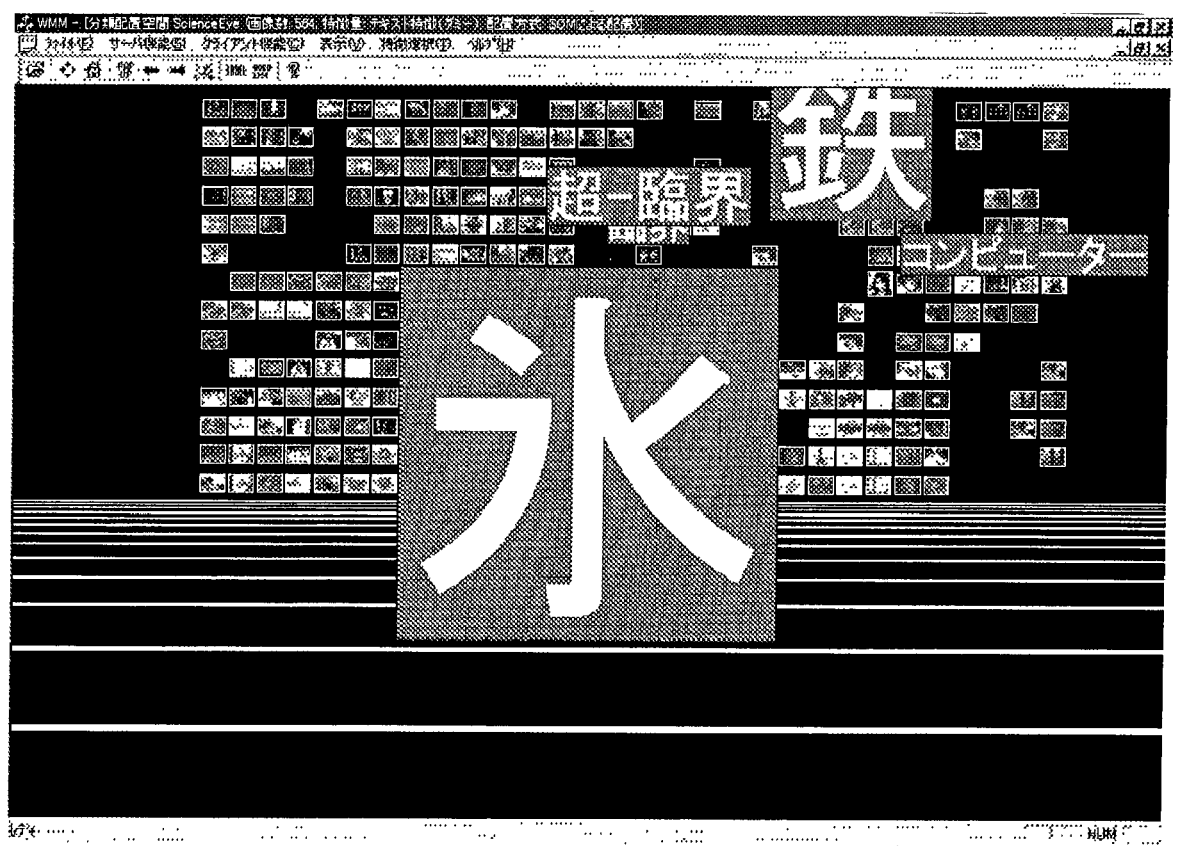
FIG. 20 is an explanatory drawing of the search screen seen when the viewpoint is moved toward label "氷" in the direction of depth.
Figure 21:
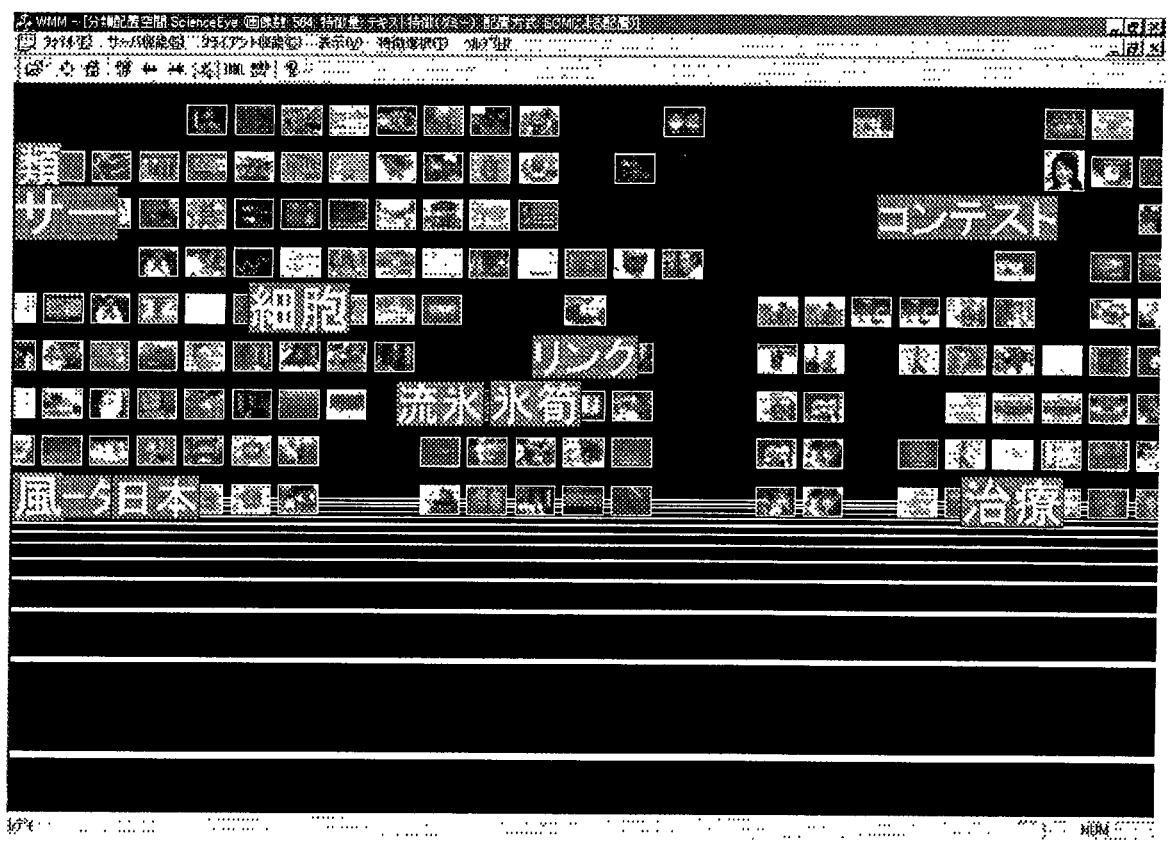
FIG. 21 is an explanatory drawing of the search screen seen when the viewpoint moves past label "氷"
Figure 22:
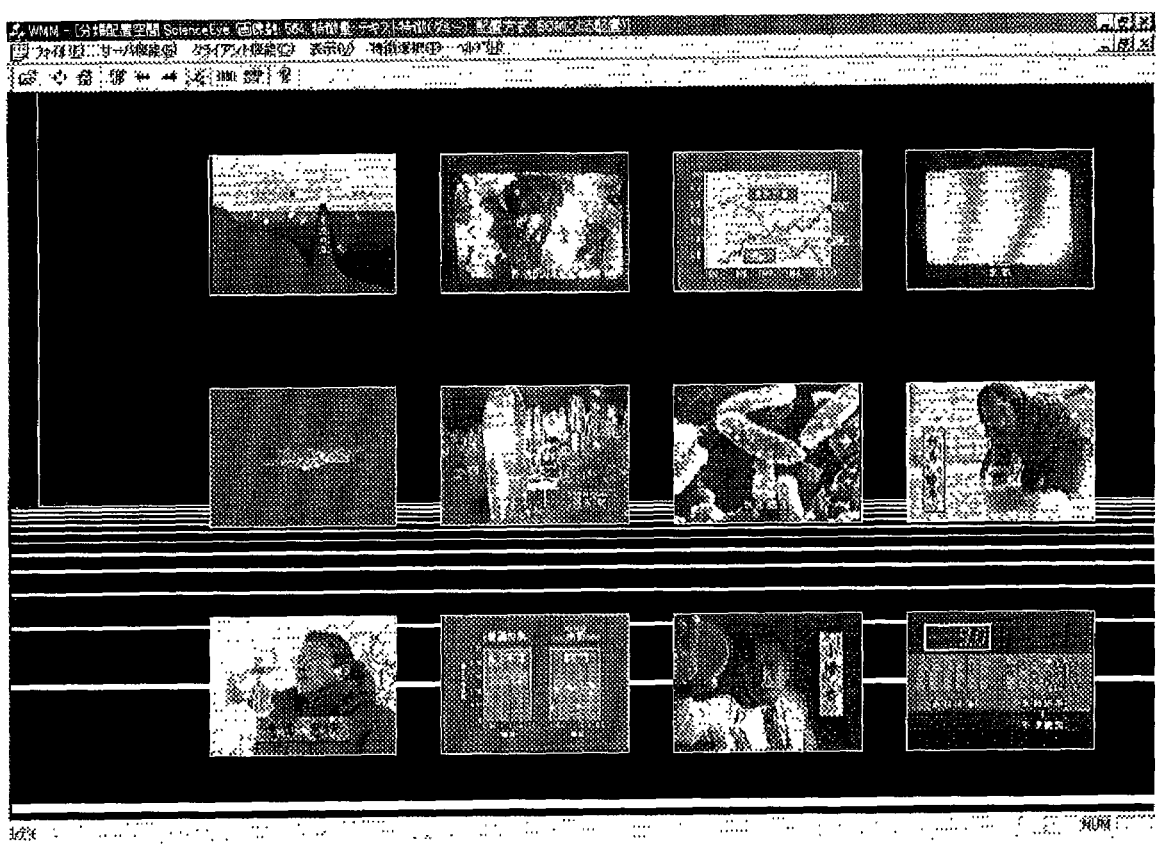
FIG. 22 is an explanatory drawing of the search screen seen when the viewpoint moves past label "氷筒" shown in FIG. 21.

FIG. 20 shows how the initial screen in FIG. 14 changes when the viewpoint, directed at label "氷" at the lower center, is moved in the direction of depth. In this case, label "氷" disappears when the viewpoint moves past this label, as well. Then, the label in the back, for example, label "氷筍" comes into sight as shown in FIG. 21. Now, when the viewpoint, directed at label "氷筍", is moved further in the direction of depth and past this label, it is possible to reach a plurality of images which correspond to label "氷筍", as shown in FIG. 22. Note that "氷" and "氷筍" mean "ice" and "ice stalagmite", respectively. Thus, the multimedia information retrieval system of the present invention allows needed images to be accurately and efficiently found based on labels representing the contents of text information, by conducting walk-through in which the viewpoint is moved by using labels placed in a virtual space as guides.

Figure 23:
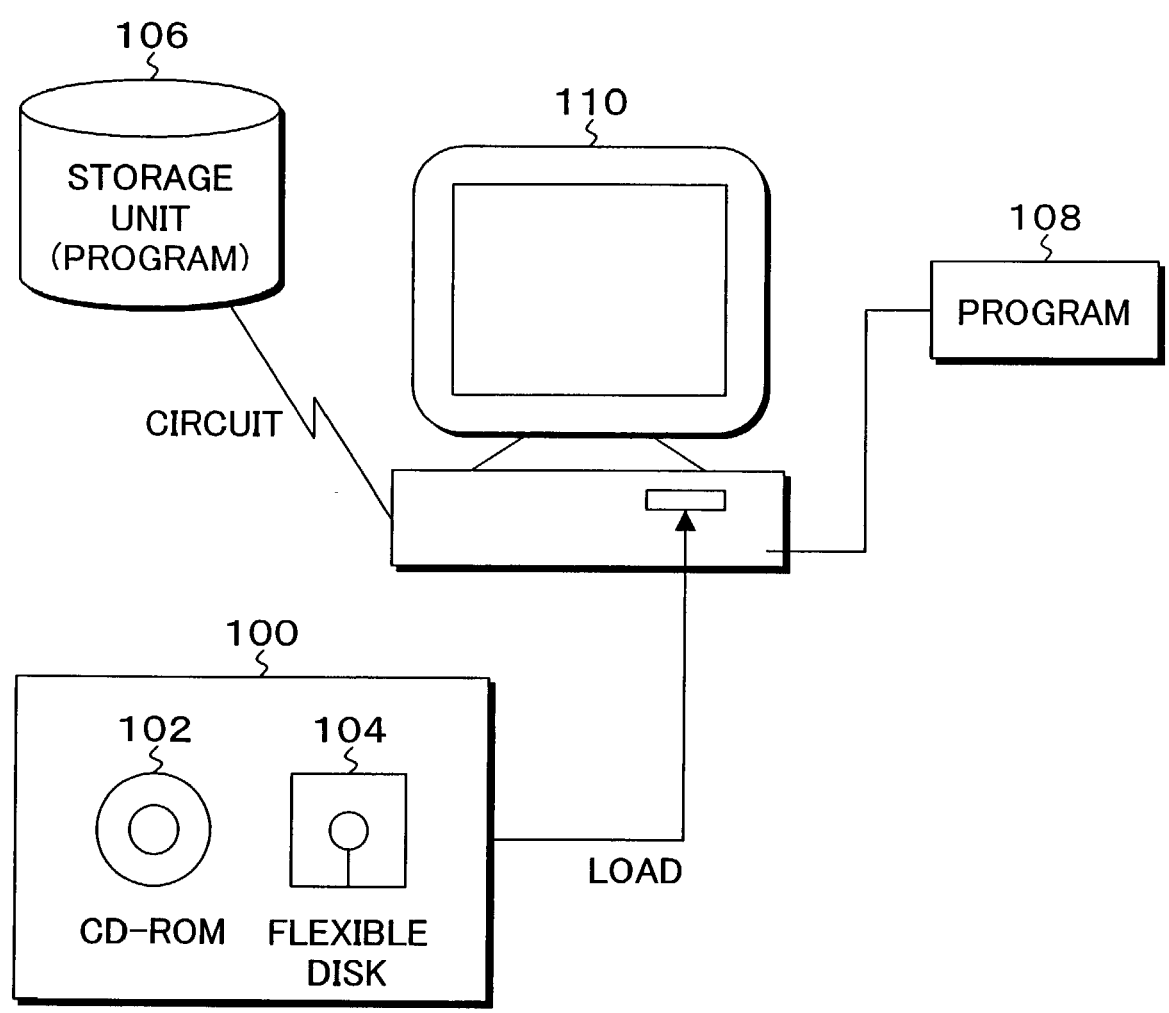
FIG. 23 is an explanatory drawing of the embodiment of a record medium in which the program of this invention is stored.

FIG. 23 depicts the embodiment of a computer-readable record medium which stores the program designed to perform multimedia information retrieval according to this invention. That is, the program handling multimedia information retrieval of this invention basically executes the processing steps in the flowchart of FIG. 3 by a computer. The record medium storing this program may be not only a portable record medium 100 such as a CD-ROM 102 and a flexible disk 104 as shown in FIG. 23 but also a record medium 106 within a storage unit available on a network and a record medium 108 such as computer's hard disk and RAM, and the program is loaded into a computer 110 and run on its main memory during program run.

Note that, for the embodiment of the record medium, image-text pairs are taken as an example of information sets collected from the Internet. However, such information sets may be multimedia information further containing moving images and music as long as such information contains combinations of images and text.

Note also that multimedia information to be retrieved by this invention is not limited to that available on the Internet and may be multimedia information available on networks or stored in servers as appropriate.

Note that, as for the hardware configuration of the multimedia information retrieval system 10 according to the present invention, the functionality of the multimedia information retrieval system 10 may be independently provided on a server or client, or that part of the functionality may be provided on a server while the remaining functionality on a client.

In this case, the client need only have information to display image and label information placed in the virtual space, with the remaining information provided on the server.

Note that, in the embodiment, text-feature-based classification and layout of image information are performed in a predetermined two-dimensional plane in a virtual space. However, it is possible to lay out image information in the direction of depth based on text features as with labels.

Note also that this invention is not limited to the embodiment and includes appropriate alterations which do not impair its purpose and advantages. Further, this invention is not limited to the numbers indicated in the embodiment.

As described above, the present invention not only classifies and lays out information sets comprised of image-text pairs in a virtual space such that similar images are located close to each other but also allows users to efficiently and properly perform visual search for images through walk-through while grasping the contents of information by labels even if a large number of images are laid out, since such labels, designed to make search based on meanings and contents, are displayed, thereby ensuring efficient and highly accurate multimedia information retrieval.

What is claimed is:

1. A multimedia information retrieval method comprising:
   a word frequency extraction step using as information sets paired image information and text information correlated to each other and extracting constituent word frequency information from said text information within said information sets;
   a text feature extraction step extracting text features, based on said word frequency information of individual information sets;
   an information set classification and layout step classifying and laying out said information sets in a virtual space, based on said text features;
   a label feature extraction step selecting labels from constituent words of said text information within each information set and extracting features of selected labels;
   a label layout step placing labels at positions corresponding to information sets classified and laid out in the virtual space, based on said label features; and
   an information display step displaying image information and labels of said information sets, placed in said virtual space, depending on the positions of the viewpoint.

2. The method as defined in claim 1, wherein said information set classification and layout step includes classifying and laying out said information sets on a two-dimensional plane at a predetermined position in a three-dimensional virtual space, based on said text features, and
wherein said label layout step includes placing said labels at the front of the two-dimensional plane in which the information sets are classified and laid out, based on said label features.

3. The method as defined in claim 1, wherein said text feature extraction step comprises:
a morpheme analysis step extracting predetermined parts of speech such as nouns, noun compounds and adjectives by morpheme analyses of text information and creating a word list comprised of words used and their frequencies of occurrence;
a matrix creation step creating a word-text matrix whose rows and columns correspond respectively to text information and words and in which word frequencies of occurrence are laid out as elements; and
a text feature conversion step expressing text information of said word-text matrix by document vectors having coordinate points determined by frequencies of occurrence in a word space which has words as axes, projecting said document vectors onto a low-dimensional space by singular value decomposition and using as text features document vectors representing positions in said low-dimensional space.

4. The method as defined in claim 3, wherein said matrix creation step comprises:
a weight assignment step assigning weight to elements in said word-text matrix, based on word frequencies of occurrence in each text.

5. The method as defined in claim 1, wherein said label feature extraction step comprises:
a label selection step figuring out the significance of each constituent word of text information within each of said information sets and selecting words to be used as labels, based on the significance figured out.

6. The method as defined in claim 5, wherein said label selection step comprises:
a morpheme analyses step extracting nouns and noun compounds by morpheme analyses of text information and creating a word list comprised of words used and their frequencies of occurrence;
a matrix creation step creating a word-text matrix whose rows and columns correspond respectively to text information and words and in which said word frequencies of occurrence are laid out as elements; and
a label feature conversion step expressing words of said word-text matrix by word vectors having coordinate points determined by frequencies of occurrence in a text space which has individual pieces of text information as axes, projecting said word vectors onto a low-dimensional space by singular value decomposition and using as label features word vectors representing positions in the low-dimensional space;
wherein a predetermined number of words are selected as labels in descending order of significance which is represented by lengths of said word vectors.

7. The method as defined in claim 5 or 6, wherein said label layout step includes displaying labels such that the higher the significance figured out by said label selection step, the more the labels are displayed toward the front of said virtual space; and
wherein said information display step includes changing how labels appear and the size in which they appear, depending on the position of the viewpoint relative to said virtual space.

8. The method as defined in claim 7, wherein said information display step includes fixing the horizontal position of said label relative to image information regardless of a horizontal displacement of the viewpoint in said virtual space and changing how labels appear and the size in which they appear depending on a change in the position of the viewpoint in the direction of depth.

9. The method as defined in claim 1, further comprising an information collection step collecting from the Internet information sets comprised of paired image and text information correlated to each other.

10. The method as defined in claim 9, wherein said information collection step comprises;
a relation analysis step analyzing the relationship between image information and text information and determining the range of information to be collected as information sets, if the relationship between said image information and said text information is unclear.

11. A computer readable record medium having therein stored a program for retrieving multimedia information, said program allowing a computer to execute:
a word frequency extraction step using as information sets paired image information and text information correlated to each other and extracting constituent word frequency information from said text information within said information sets
a text feature extraction step extracting text features, based on said word frequency information of individual information sets;
an information set classification and layout step classifying and laying out said information sets in a virtual space, based on said text features;
a label feature extraction step selecting labels from constituent words of said text information within each information set and extracting features of selected labels;
a label layout step placing labels at positions corresponding to information sets classified and laid out in the virtual space, based on said label features; and
an information display step displaying image information and labels of said information sets, placed in said virtual space, depending on the positions of the viewpoint.

12. The program as defined in claim 11, wherein said information set classification and layout step includes classifying and laying out said information sets on a two-dimensional plane at a predetermined position in a three-dimensional virtual space, based on said text features, and
wherein said label layout step includes placing said labels at the front of the two-dimensional plane in which the information sets are classified and laid out, based on said label features.

13. The program as defined in claim 11, wherein said text feature extraction step comprises:
a morpheme analysis step extracting predetermined parts of speech such as nouns, noun compounds and adjectives by morpheme analyses of text information and creating a word list comprised of words used and their frequencies of occurrence;
a matrix creation step creating a word-text matrix whose rows and columns correspond respectively to text information and words and in which word frequencies of occurrence are laid out as elements; and a text feature conversion step expressing text information of said word-text matrix by document vectors having coordinate points determined by frequencies of occurrence in a word space which has words as axes, projecting said document vectors onto a low-dimensional space by singular value decomposition and using as text features document vectors representing positions in said low-dimensional space.

14. The program as defined in claim 13, wherein said matrix creation step comprises:

a weight assignment step assigning weight to elements in said word-text matrix, based on word frequencies of occurrence in each text.

15. The program as defined in claim 11, wherein said label feature extraction step comprises:

a label selection step figuring out the significance of each constituent word of text information within each of said information sets and selecting words to be used as labels, based on the significance figured out.

16. The program as defined in claim 15, wherein said label selection step comprises:

a morpheme analyses step extracting nouns and noun compounds by morpheme analyses of text information and creating a word list comprised of words used and their frequencies of occurrence;

a matrix creation step creating a word-text matrix whose rows and columns correspond respectively to text information and words and in which said word frequencies of occurrence are laid out as elements; and a label feature conversion step expressing words of said word-text matrix by word vectors having coordinate points determined by frequencies of occurrence in a text space which has individual pieces of text information as axes, projecting said word vectors onto a low-dimensional space by singular value decomposition and using as label features word vectors representing positions in the low-dimensional space; wherein a predetermined number of words are selected as labels in descending order of significance which is represented by lengths of said word vectors.

17. The program as defined in claim 15 or 16, wherein said label layout step includes displaying labels such that the higher the significance figured out by said label selection step, the more the labels are displayed toward the front of said virtual space; and wherein said information display step includes changing how labels appear and the size in which they appear, depending on the position of the viewpoint relative to said virtual space.

18. The program as defined in claim 17, wherein said information display step includes fixing the horizontal position of said label relative to image information regardless of a horizontal displacement of the viewpoint in said virtual space and changing how labels appear and the size in which they appear depending on a change in the position of the viewpoint in the direction of depth.

19. The program as defined in claim 11, further comprising:

an information collection step collecting from the Internet information sets comprised of paired image and text information correlated to each other.

20. The program as defined in claim 19, wherein said information collection step comprises:

a relation analysis step analyzing the relationship between image information and text information and determining the range of information to be collected as information sets, if the relationship between said image information and said text information is unclear.

21. A multimedia information retrieval system comprising:

a word frequency extraction unit using as information sets paired image information and text information correlated to each other and extracting constituent word frequency information from said text information within said information sets;

a text feature extraction unit extracting text features, based on said word frequency information of individual information sets;

an information set classification and layout unit classifying and laying out said information sets in a virtual space, based on said text features;

a label feature extraction unit selecting labels from constituent words of said text information within each information set and extracting features of selected labels;

a label layout unit placing labels at positions corresponding to information sets classified and laid out in the virtual space, based on said label features; and an information display unit displaying image information and labels of said information sets, placed in said virtual space, depending on the positions of the viewpoint.

* * * * *

UNITED STATES PATENT AND TRADEMARK OFFICE
CERTIFICATE OF CORRECTION

| | |
|---|---|
| PATENT NO. | : 7,167,823 B2 |
| APPLICATION NO. | : 10/305184 |
| DATED | : January 23, 2007 |
| INVENTOR(S) | : Susumu Endo et al. |

Page 1 of 1

It is certified that error appears in the above-identified patent and that said Letters Patent is hereby corrected as shown below:

Column 14, Line 17, Claim 10 change "comprises;" to --comprises:--.

Column 14, Line 30, Claim 11 change "sets" to --sets;--.

Signed and Sealed this

Fourth Day of December, 2007

JON W. DUDAS
*Director of the United States Patent and Trademark Office*